(12) United States Patent
Wallach

(10) Patent No.: US 12,131,178 B2
(45) Date of Patent: *Oct. 29, 2024

(54) DYNAMIC CONFIGURATION OF A COMPUTER PROCESSOR BASED ON THE PRESENCE OF A HYPERVISOR

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,858

(22) Filed: Nov. 11, 2022

(65) Prior Publication Data

US 2023/0074273 A1 Mar. 9, 2023

Related U.S. Application Data

(63) Continuation of application No. 16/520,304, filed on Jul. 23, 2019, now Pat. No. 11,500,665.

(Continued)

(51) Int. Cl.
*G06F 9/455* (2018.01)
*G06F 9/4401* (2018.01)
(Continued)

(52) U.S. Cl.
CPC ........ *G06F 9/45558* (2013.01); *G06F 9/4401* (2013.01); *G06F 9/4403* (2013.01);
(Continued)

(58) Field of Classification Search
None
See application file for complete search history.

(56) References Cited

U.S. PATENT DOCUMENTS

| 4,386,399 A | 5/1983 | Rasala et al. |
| 4,409,655 A | 10/1983 | Wallach et al. |

(Continued)

FOREIGN PATENT DOCUMENTS

| WO | 2013174503 | 11/2013 |
| WO | 2013174503 A1 | 11/2013 |

OTHER PUBLICATIONS

"Hash table. Collision resolution by chaining (closed addressing)", Algorithms and Data Strcutures: with implementations in Java and C++, http://www.algolist.net/Data_structures/Hash_table/Chaining, printed on Aug. 30, 2018.

(Continued)

*Primary Examiner* — Qing Yuan Wu
(74) *Attorney, Agent, or Firm* — Greenberg Traurig

(57) ABSTRACT

Systems, apparatuses, and methods related to a hypervisor status register in a computer processor are described. For example, a memory coupled to the computer processor can store instructions of routines of predefined, non-hierarchical domains. The computer processor can store a value in the hypervisor status register during a power up process of the computer system. The value stored in the hypervisor status register that identifies whether or not an operating hypervisor is present in the computer system. The computer processor can configure its operations (e.g., address translation) based on the value stored in the hypervisor status register.

20 Claims, 9 Drawing Sheets

Related U.S. Application Data

(60) Provisional application No. 62/724,929, filed on Aug. 30, 2018, provisional application No. 62/724,999, filed on Aug. 30, 2018, provisional application No. 62/724,896, filed on Aug. 30, 2018, provisional application No. 62/725,100, filed on Aug. 30, 2018, provisional application No. 62/724,913, filed on Aug. 30, 2018, provisional application No. 62/725,030, filed on Aug. 30, 2018.

(51) Int. Cl.
    *G06F 12/1009*     (2016.01)
    *G06F 9/48*     (2006.01)
    *G06F 13/10*     (2006.01)

(52) U.S. Cl.
    CPC .......... *G06F 12/1009* (2013.01); *G06F 9/485* (2013.01); *G06F 13/102* (2013.01)

(56) References Cited

U.S. PATENT DOCUMENTS

| | | | |
|---|---|---|---|
| 4,525,780 A | 6/1985 | Bratt et al. | |
| 4,821,184 A | 4/1989 | Clancy et al. | |
| 5,280,614 A | 1/1994 | Munroe et al. | |
| 6,393,544 B1 | 5/2002 | Bryg et al. | |
| 6,446,188 B1 | 9/2002 | Henderson et al. | |
| 7,370,193 B2 | 5/2008 | Shao et al. | |
| 8,245,270 B2 | 8/2012 | Cooperstein et al. | |
| 8,607,299 B2 | 12/2013 | Baker | |
| 8,713,563 B2 | 4/2014 | Kondoh et al. | |
| 9,405,515 B1 | 8/2016 | Bertram et al. | |
| 9,519,779 B2 | 12/2016 | Ghosh et al. | |
| 9,575,784 B1 | 2/2017 | Aron et al. | |
| 9,852,084 B1 | 12/2017 | Soderquist et al. | |
| 10,043,001 B2 | 8/2018 | Ghosh et al. | |
| 10,757,100 B2 | 8/2020 | Angelino et al. | |
| 10,915,457 B2 | 2/2021 | Wallach | |
| 10,915,465 B2 | 2/2021 | Wallach | |
| 10,942,863 B2 | 3/2021 | Wallach | |
| 10,984,097 B2 | 4/2021 | Ghosh et al. | |
| 11,182,507 B2 | 11/2021 | Wallach | |
| 11,436,156 B2 | 9/2022 | Wallach | |
| 11,481,241 B2 | 10/2022 | Wallach | |
| 11,500,665 B2 | 11/2022 | Wallach | |
| 2002/0184345 A1 | 12/2002 | Masuyama et al. | |
| 2004/0078631 A1 | 4/2004 | Rogers et al. | |
| 2004/0133777 A1 | 7/2004 | Kiriansky et al. | |
| 2004/0221036 A1 | 11/2004 | Smith | |
| 2005/0257243 A1 | 11/2005 | Baker | |
| 2008/0086729 A1 | 4/2008 | Kondoh et al. | |
| 2008/0091891 A1 | 4/2008 | Shiota et al. | |
| 2008/0104586 A1 | 5/2008 | Thorton et al. | |
| 2008/0162680 A1 | 7/2008 | Zimmer et al. | |
| 2008/0244206 A1 | 10/2008 | Heo et al. | |
| 2008/0250216 A1 | 10/2008 | Kershaw et al. | |
| 2008/0250217 A1 | 10/2008 | Kershaw et al. | |
| 2008/0276051 A1 | 11/2008 | Renno | |
| 2009/0259846 A1 | 10/2009 | Watt et al. | |
| 2010/0228936 A1 | 9/2010 | Wright et al. | |
| 2010/0228943 A1 | 9/2010 | Deshpande et al. | |
| 2010/0235598 A1 | 9/2010 | Bouvier | |
| 2011/0055528 A1 | 3/2011 | Kondoh et al. | |
| 2012/0036334 A1 | 2/2012 | Horman et al. | |
| 2012/0042144 A1 | 2/2012 | Grisenthwaite | |
| 2013/0132690 A1 | 5/2013 | Epstein | |
| 2013/0132695 A1 | 5/2013 | Heo et al. | |
| 2013/0151831 A1 | 6/2013 | Bealkowski et al. | |
| 2014/0173169 A1 | 6/2014 | Liu et al. | |
| 2014/0331019 A1 | 11/2014 | Parker et al. | |
| 2015/0100717 A1 | 4/2015 | Bennett et al. | |
| 2015/0128249 A1 | 5/2015 | Alexandrian et al. | |
| 2015/0180894 A1 | 6/2015 | Sadovsky et al. | |
| 2015/0301850 A1 | 10/2015 | Jeong et al. | |
| 2016/0110298 A1 | 4/2016 | Koufaty et al. | |
| 2016/0210082 A1 | 7/2016 | Frank et al. | |
| 2016/0350019 A1 | 12/2016 | Koufaty et al. | |
| 2016/0381050 A1 | 12/2016 | Shanbhogue et al. | |
| 2017/0060783 A1 | 3/2017 | Chiu et al. | |
| 2017/0367036 A1 | 12/2017 | Chen et al. | |
| 2018/0048648 A1 | 2/2018 | Angelino et al. | |
| 2018/0060244 A1 | 3/2018 | Godard et al. | |
| 2018/0095902 A1 | 4/2018 | Lemay et al. | |
| 2018/0121665 A1 | 5/2018 | Anderson et al. | |
| 2019/0102537 A1 | 4/2019 | Zhang et al. | |
| 2019/0196983 A1 | 6/2019 | Khosravi et al. | |
| 2020/0073693 A1 | 3/2020 | Wallach | |
| 2020/0073694 A1 | 3/2020 | Wallach | |
| 2020/0073820 A1 | 3/2020 | Wallach | |
| 2020/0073821 A1 | 3/2020 | Wallach | |
| 2020/0073822 A1 | 3/2020 | Wallach | |
| 2020/0073827 A1 | 3/2020 | Wallach | |
| 2020/0074093 A1 | 3/2020 | Wallach | |
| 2020/0074094 A1 | 3/2020 | Wallach | |
| 2021/0141742 A1 | 5/2021 | Wallach | |
| 2021/0149817 A1 | 5/2021 | Wallach | |
| 2021/0157741 A1 | 5/2021 | Wallach | |
| 2021/0240619 A1 | 8/2021 | Earnshaw | |
| 2022/0050908 A1 | 2/2022 | Wallach | |

OTHER PUBLICATIONS

Call stack, Wikipedia, printed on Aug. 10, 2018.
Capability-based addressing, Wikipedia, printed on Sep. 13, 2018.
Explain Hashed page tables in operating system, https://cs.stackexchange.com/questions/85207/explain-hashed-page-tables-in-operating-system, printed on Aug. 17, 2018.
Extended European Search Report, EP19853813.4, mailed on Apr. 4, 2022.
Extended European Search Report, EP19854058.5, mailed on Apr. 20, 2022.
Fernandez, Eduardo B., et al. "Patterns for the secure and reliable execution of processes." Pattern Languages of Programs, ACM, Oct. 18, 2008.
G. J. Myers, B. R. S. Buckingham, "A Hardware Implemenation of Capability-based Addressing", ACM SIGARCH Computer Architecture News Homepage archive, vol. 8, Iss. 6, Oct. 1980.
George Radin, Peter R. Schneider, "An Architecture for an Extended Machine With Protected Addressing", May 21, 1976.
Hash table, Wikipedia, printed on Aug. 30, 2018.
Hypervisor, Wikipedia, printed on Apr. 19, 2018.
International Search Report and Written Opinion, PCT/US2019/048023, mailed Dec. 17, 2019.
International Search Report and Written Opinion, PCT/US2019/048020, mailed Dec. 17, 2019.
International Search Report and Written Opinion, PCT/US2019/048019, mailed Dec. 17, 2019.
International Search Report and Written Opinion, PCT/US2019/048013, mailed Dec. 13, 2019.
International Search Report and Written Opinion, PCT/US2019/048018, mailed Dec. 17, 2019.
Martinsen, Jayce. "Implementation of Intel Virtual Machine Extension Root Operation on the NPS Least Privilege Separation Kernel." Naval Postgraduate School thesis, Sep. 2010.
Michael D. Schroeder, Jerome H. Saltzer, "A Hardware Architecture for Implementing Protection Rings", Presented at the Third ACM Symposium on Operating Systems Principles, Palo Alto, CA, Oct. 1971.
Page replacement algorithm, Wikipedia, printed on Jul. 31, 2018.
Page table, Wikipedia, printed on Jul. 31, 2018.
Protection ring, Wikipedia, printed on Jul. 31, 2018.
R. S. Fabry, "Capability-Based Addressing", Communications of the ACM, Jul. 1974.
Sandbox (computer security), Wikipedia, printed on Aug. 21, 2018.
Stack register, Wikipedia, printed on Aug. 10, 2018.
The RISC-V Instruction Set Manual, vol. II: Privileged Architecture, May 7, 2017.
Vmware. "Mechanisms to determine if software is running in a Vmware virtual machine." Retrieved from the Internet <https://kb.vmware.com/s/article/1009458> on Nov. 23, 2021.

(56) References Cited

OTHER PUBLICATIONS

Extended European Search Report, EP19856112.8, mailed on Apr. 14, 2022.
Extended European Search Report, EP19855925.4, mailed on Apr. 11, 2022.
Extended European Search Report, EP19854049.4, mailed on Apr. 7, 2022.
Extended European Search Report, EP19855829.8, mailed on Apr. 11, 2022.
Extended European Search Report, EP19854485.7, mailed on Apr. 11, 2022.
Extended European Search Report, EP19854059.3, mailed on Apr. 11, 2022.
International Search Report and Written Opinion, PCT/US2019/048015, mailed Dec. 12, 2019.
International Search Report and Written Opinion, PCT/US2019/048006, mailed Dec. 11, 2019.
International Search Report and Written Opinion, PCT/US2019/048008, mailed Dec. 12, 2019.
Lluis Vilanova et al., "CODOMs: Protecting Software with Code-centric Memory Domains," ACM SIGARCH Computer Architecture News, Jun. 2014.
Title: Security Configuration for Memory Address Translation from Object Specific Virtual Address Spaces to a Physical Address Space, U.S. Appl. No. 16/520,311, filed Jul. 23, 2019 Confirmation: 9553 Status Date: Oct. 17, 2022 Inventor: Steven Wallach Status: Response to Non-Final Office Action Entered and Forwarded to Examiner.
Access Control for Processor Registers based on Execution Domains, U.S. Appl. No. 16/520,290, filed Jul. 23, 2019 Confirmation: 4266 Status Date: Oct. 26, 2022 Inventor: Steven Wallach Status: Final Rejection Mailed.
Domain Crossing in Executing Instructions in Computer Processors, U.S. Appl. No. 17/511,756, filed Oct. 27, 2021 Confirmation: 8247 Status Date: Nov. 13, 2021 Inventor: Steven Wallach Status: Docketed New Case—Ready for Examination.
Dynamic Configuration of a Computer Processor based on the Presence of a Hypervisor, U.S. Appl. No. 16/520,304, filed Jul. 23, 2019 Confirmation: 1033 Status Date: Oct. 26, 2022 Inventor: Steven Wallach Status: Patented Case.
Virtual Machine Register in a Computer Processor, U.S. Appl. No. 17/942,558, filed Sep. 12, 2022 Confirmation: 1068 Status Date: Sep. 29, 2022 Inventor: Steven Wallach Status: Docketed New Case—Ready for Examination.
Security Configurations in Page Table Entries for Execution Domains, U.S. Appl. No. 17/170,763, filed Feb. 8, 2021 Confirmation: 7019 Status Date: Nov. 21, 2022 Inventor: Steven Wallach Status: Notice of Allowance Mailed—Application Received in Office of Publications.

DYNAMIC CONFIGURATION OF A COMPUTER PROCESSOR BASED ON THE PRESENCE OF A HYPERVISOR

RELATED APPLICATIONS

The present application is a continuation application of U.S. patent application Ser. No. 16/520,304, filed Jul. 23, 2019, issued as U.S. Pat. No. 11,500,665, on Nov. 15, 2022, which claims the benefit of the filing dates of Prov. U.S. Pat. App. Ser. No. 62/725,100, filed on Aug. 30, 2018 and entitled "Dynamic Configuration of a Computer Processor based on the Presence of a Hypervisor," Prov. U.S. Pat. App. Ser. No. 62/724,896, filed on Aug. 30, 2018 and entitled "Memory Access Control through Permissions Specified in Page Table Entries for Execution Domains," Prov. U.S. Pat. App. Ser. No. 62/724,913, filed on Aug. 30, 2018 and entitled "Security Configurations in Page Table Entries for Execution Domains," Prov. U.S. Pat. App. Ser. No. 62/724,929, filed on Aug. 30, 2018 and entitled "Access Control for Processor Registers based on Execution Domains," Prov. U.S. Pat. App. Ser. No. 62/724,999, filed on Aug. 30, 2018 and entitled "Domain Register for Instructions being Executed in Computer Processors," and Prov. U.S. Pat. App. Ser. No. 62/725,030, filed on Aug. 30, 2018 and entitled "Domain Crossing in Executing Instructions in Computer Processors," the entire disclosures of which applications are hereby incorporated herein by reference.

FIELD OF THE TECHNOLOGY

At least some embodiments disclosed herein relate generally to computer architecture and more specifically, but not limited to, dynamic configuration of a computer processor based on the presence of an operating hypervisor.

BACKGROUND

Instructions programmed for a computer can be structured in layers. Once layer can provide resources and services for another layer. For example, a hypervisor can create or provision virtual machines that are implemented on the hardware components of the computer. An operating system can offer resources and services using resources available in a computer having predefined architecture. The computer resources or computer operated upon by the operating system can be actual computer hardware components, or virtual machine components provisioned by a hypervisor. An application can provide application specific functions using the services and resources provided by an operating system.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes a hypervisor status register that stores an indication of whether a computer processor is operating with a hypervisor. A hypervisor or virtual machine monitor (VMM) creates and manages virtual machines. The hypervisor can control basic functions such as physical memory and input/output (I/O). A computer processor can run with or without a hypervisor. The content of the hypervisor status register can be used to configure the computer processor for efficient processing based on whether a hypervisor is present and operating in the computer system.

In a traditional system, different layers of instructions (e.g., user applications vs. operating system) may be given different levels of privilege and/or trust. Conventionally, protection rings have been constructed and implemented in computers to protect data and functionality from fault and malicious behaviors based on a hierarchy of rings. Rings are statically arranged in the hierarchy from most privileged (and thus most trusted) to least privileged (and thus least trusted). For example, the hierarchy can include a ring of operating system kernel that is the most privileged, a ring of device drivers, and a ring of applications that are the least privileged. A program or routine in a lower privilege ring can be limited by a respective special hardware enforced control gate to access the resources and services of a higher privilege ring in the hierarchy. Gating access between rings can improve security.

In the techniques of the present disclosure, instructions or routines programmed for a computer system can be classified into a set of predefined, non-hierarchical, domains, such as a domain of hypervisor, a domain of operating system, a domain of application, etc. Addresses used in different domains can be translated using different address translation tables such that the virtual address spaces of different domains can be isolated from each other. If a hypervisor is present (e.g., operating and controlling the lowest level of machine architecture in the computer system), addresses used in different virtual machines managed by the hypervisor can also be translated using different address tables; and thus, the virtual address spaces of different virtual machines can also be isolated from each other. Further, virtual address spaces of different running processes can also be optionally isolated from each other. For example, a virtual machine register can be configured to store an identifier of the current virtual machine for which the processor is executing instructions; and the address translation function of a memory management unit of the processor can be configured, in accordance with the identifier stored in the virtual machine register, the identifier stored in the domain register, and/or the status indication stored in the hypervisor status register, to perform address translation for the execution of a routine in a particular domain for a particular virtual machine.

Figure 1:
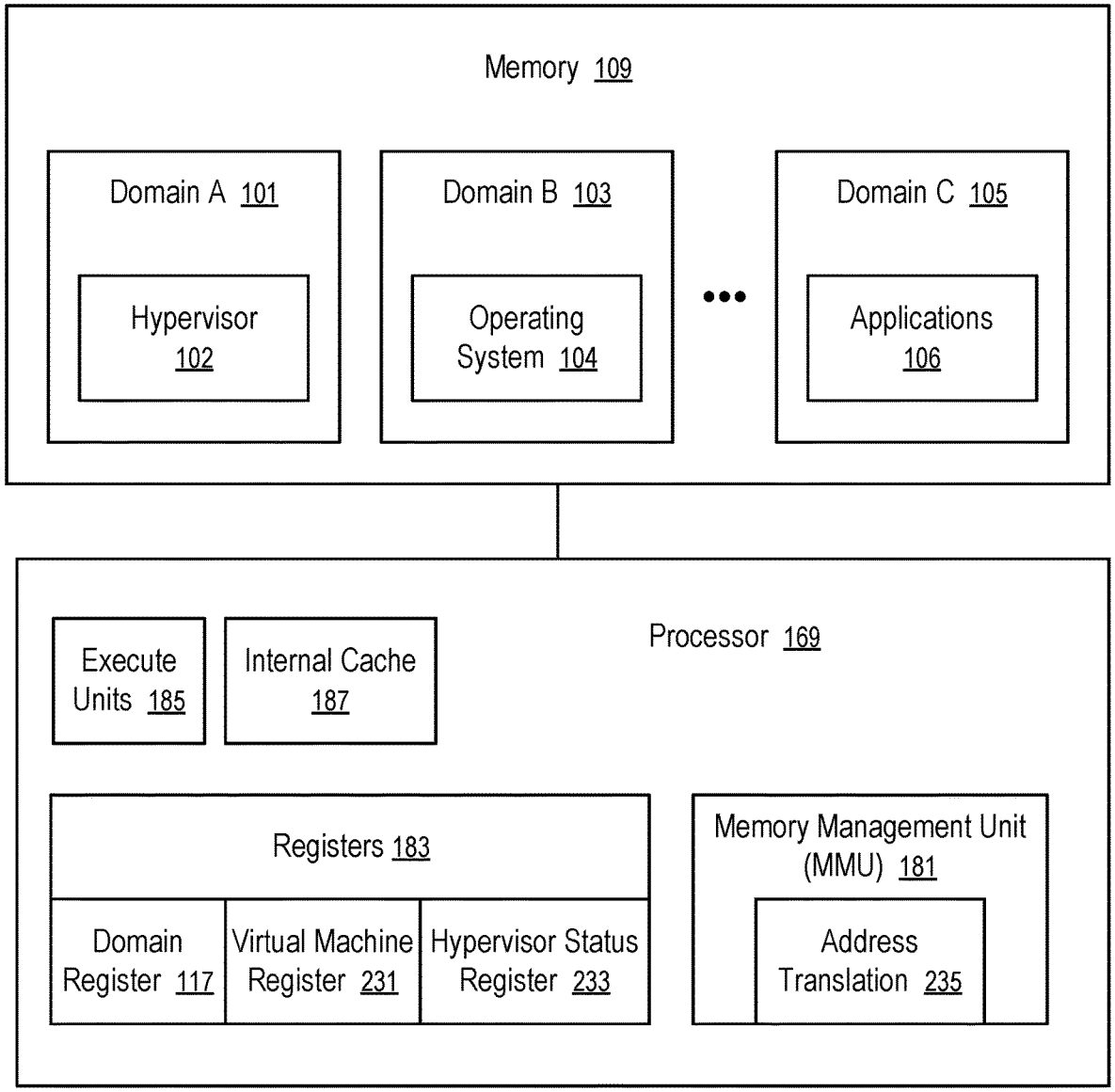
FIG. 1 shows a computer processor having a set of registers configured to control the operations of the computer processor according to some embodiments.

FIG. 1 shows a computer processor (169) having a set of registers (183) configured to control the operations of the computer processor (169) according to some embodiments. The set of registers (183) can include at least a domain register (117), a virtual machine register (231), and/or a hypervisor status register (223).

The domain register (117) is configured to store an identifier or indication of the current domain of the instructions that are being executed in the processor (169).

For example, the computer processor (169) of FIG. 1 can be coupled to physical memory (109). The physical memory (109) can store data and instructions for various routines programmed for a computer system. Routines can be classified into various predefined, non-hierarchical, domains (101, 103, . . . , 105), such as a domain (101) of hypervisor (102), a domain (103) of operating system (104), a domain (105) of application (106).

For example, routines of a hypervisor (102) can be classified in a domain A (101); routines of an operating system (104) can be classified in another domain B (103); and routines of applications (106) can be classified in a further domain C (105). A hypervisor or virtual machine monitor (VMM) creates and manages virtual machines. The hypervisor can control basic functions such as physical memory and input/output (I/O).

The computer processor (169) can be optionally used with or without an operating hypervisor (102). When no hypervisor (102) is operating or present in the computer system of FIG. 1, the operating system (104) can control the entire computer system. When the hypervisor (102) is operating or present in the computer system of FIG. 1, the hypervisor (102) can provision one or more virtual machines; each virtual machine can run its instance of the operating system (104); and the operating system (104) running in a virtual machine can control the resources of the virtual machine provisioned by the hypervisor (102) but not the resources not provisioned to virtual machine. Thus, when the hypervisor (102) is present or operating in the computer system, the operating system in a virtual machine hosted on the computer system may not have control over a portion of the computer system that would be controlled by the operating system when the hypervisor (102) is not present or operating. For example, when the hypervisor (102) provisions a portion of the memory (109) to a virtual machine, the operating system (104) running in the virtual machine can access the portion of the memory (109) via pseudo-physical memory addresses, where the operating system (104) can treat the pseudo-physical memory addresses as physical memory addresses which are actually mapped to the portion of the memory (109) that is allocated by the hypervisor (102) to the virtual machine.

For example, the computer system of FIG. 1 can be powered up or bootstrapped in a mode in which the computer system does not have an operating/running hypervisor (102). In such a mode, the operating system (104) directly controls the hardware resources (e.g., the processor (169) and the memory (109)). Alternatively, the computer system of FIG. 1 can be started in a mode in which the computer system has an operating/running hypervisor (102); the hypervisor (102) can create and manage one or more virtual machines; and each virtual machine can run a copy of the operating system (104) where the operating system (104) can control the hardware resources provisioned by the hypervisor (102) for the respective virtual machine.

In some instances, the processor (189) is coupled with the memory (109) having the hypervisor (102); and the computer system can optionally be bootstrapped into operation with or without an operating hypervisor (102). In other instances, the processor (189) can be optionally coupled to memory that does not have the hypervisor (102) and thus cannot run a hypervisor (102).

The hypervisor status register (233) is configured to store an indicator of whether a hypervisor (102) is present in the computer system. For example, the hypervisor status register (233) can have an initialized value during powering up to indicate the lack of hypervisor (102). If the hypervisor (102) is loaded for execution during the bootstrap process, the hypervisor status register (233) is set to indicate the presence of an operating hypervisor (102). The content of the hypervisor status register (233) allows the processor (189) to customize its operations, such as address translation (235) of a memory management unit (MMU) (181), based on whether or not a hypervisor (102) is present.

For example, when the hypervisor status register (233) indicates that no hypervisor (102) is present, the operating system (104) running in the computer system does not rely upon a hypervisor (102) for the management of resources and/or services. The domain (101) of the hypervisor (102) is not applicable for the instruction execution in the processor (169); and the operating system (104) is provided with full access to resources, such as the entire physical memory (109).

However, when the hypervisor status register (233) indicates that a hypervisor (102) is present, the operating system (104) running in a virtual machine is restricted to resources and/or services provisioned by the hypervisor (102) for the virtual machine. The domain (101) of the hypervisor (102) is thus relevant for the instruction execution in the processor (169). For example, certain operations performed in the routines of the operating system (104) can trigger corresponding operations in the hypervisor (102).

In general, a hypervisor (102) can be present, even though the current domain of execution as indicated by the domain register (117) is different from the domain (101) of hypervisor (102). For example, the processor (169) can execute an application (106) in the domain (105) and rely upon the operating system (104) to access memory (109); and the hypervisor (102) can restrict the operating system (104) in accessing the memory (109) to a portion that is provisioned by the hypervisor (102) to a virtual machine in which the operating system (104) is running. Thus, the execution of the application (106) in the domain (105) can shift to execution in the domain (103) of operating system (104) and/or to execution in the domain (101) of hypervisor (102).

In general, the content of the hypervisor status register (223) indicates whether a hypervisor (102) is present, which is an indication of whether the domains (103, . . . , 105) are operating within the constraint of a hypervisor (102) or a virtual machine.

When a hypervisor (102) is present, the virtual machine register (231) can store an identifier of the current virtual machine for which the processor (169) is currently running a routine in a domain (e.g., 101, 103, . . . , or 105). For example, when the processor (169) is executing a routine in the domain (103) of operating system (104), the virtual machine register (231) stores the identifier of the virtual machine for which the routine is being executed in the processor (169). For example, when the processor (169) is executing a routine in the domain (105) of applications (106), the virtual machine register (231) stores the identifier of the virtual machine in which the application is running.

In some implementations, the virtual machine register (231) and the hypervisor status register (233) can be combined. For example, when the virtual machine register (231) has a predetermined value (e.g., zero), the virtual machine register (231) indicates that no hypervisor is present in the computer system; and when the virtual machine register (231) has a value different from the predetermined value, the content of the virtual machine register (231) uniquely identifies a virtual machine for which the processor (169) is currently executing instructions.

In some implementations, the virtual machine register (231) and the hypervisor status register (233) are separate registers and/or have different access privileges for different domains (e.g., 101, 103, . . . , 105). For example, the hypervisor status register (233) cannot be changed without restarting the computer system in a bootstrap process. For example, the hypervisor status register (233) can be accessed by the domain (101) of the hypervisor (102) but not by the domain (103) of the operating system and/or the domain (105) of the applications; and the virtual machine register (231) can be accessed by both the domain (101) of the hypervisor (102) and the domain (103) of the operating system (104).

The processor (169) of FIG. 1 includes a memory management unit (MMU) (181) that implements a function of address translation (235). The processor (169) can configure the address translation (235) based on the content of the hypervisor status register (233).

For example, when the hypervisor status register (233) has a first value (e.g., 0) indicating the absence of a hypervisor (102), the processor (169) configures the address translation (235) to function without using the virtual machine register (231). When the hypervisor status register (233) has a second value (e.g., 1) indicating the presence of a hypervisor (102), the processor (169) configures the address translation (235) to function using the virtual machine register (231) such that address translation is specific for a virtual machine.

The processor (169) of FIG. 1 has execution units (e.g., 185), such as an arithmetic-logic unit. The processor (169) can include an internal cache (187) as a proxy of a portion of the memory (109). In additional to the domain register (117), the virtual machine register (231), and the hypervisor status register (233), the processor (169) can have other registers (183) to hold instructions for execution, data as operands of instructions, and/or results of instruction executions.

In general, a routine can include a pre-programmed set of instructions stored in the memory (109). The routine can also have input data, output data, and/or, temporary data stored in the memory (109). A routine can invoke or call another routine for services and/or resources. The calling routine and the called routine can be in a same domain or different domains (e.g., 101, 103, . . . , 105).

Optionally, the content of the domain register (117) can control security operations in the processor (189) as discussed further below.

In one implementation, when a computer system having the processor (169) is initially powered on (bootstrapped), the processor (169) is configured to automatically execute routines of a hypervisor (102) or an operating system (104) (if no hypervisor is used), as part of the bootstrap process. Thus, the domain register (117) is initially set to indicate the domain (101) of the hypervisor (102) or the domain (103) of the operating system (104). Subsequently, the execution control can move from one domain to another domain using instructions that identify the destination domains; and the content of the domain register (117) can be updated according to the processing of such instructions. Some examples and details of domain crossing can be found in U.S. Pat. App. Ser. No. 62/725,030, filed on Aug. 30, 2018 and entitled "Domain Crossing in Executing Instructions in Computer Processors," the entire disclosure of which application is hereby incorporated herein by reference.

Alternatively, or in combination, the domain of the currently running routine can be identified based on memory addresses, stored attributes of the routines, etc. For example, some techniques to specify the current domain (123) in the domain register (117) in the computer processor (169) can be found in U.S. Pat. App. Ser. No. 62/724,999, filed on Aug. 30, 2018 and entitled "Domain Register for Instructions being Executed in Computer Processors," the entire disclosure of which application is hereby incorporated herein by reference.

In some instances, the current domain can be identified from a memory address used to load an instruction of a routine for execution.

For example, a virtual memory address (e.g., 195 illustrated in FIG. 5) can have a predetermined width (e.g., a predetermined number of bits) for the processor (169). The memory address can include a portion representing an object ID (e.g., 199 illustrated in FIG. 5) and a portion representing an offset (e.g., 196 illustrated in FIG. 5) within the object represented by the object ID (e.g., 199). For example, the routine can be an object located at the address; and the object ID of the address can be used to identify certain proprieties of the instruction and/or the routine; and the current domain can be determined from the properties.

For example, a static object ID of a predetermined value (e.g., 0) can be used to represent a kernel object of an operating system (104). Thus, the static object ID specified in the memory address can be used to identify the current domain for the execution of the routine. Some details and examples of static object IDs in memory addresses for computer processors to load instructions for execution can be found in U.S. patent application Ser. No. 16/028,840, filed Jul. 6, 2018 and entitled "Static Identifications in Object-based Memory Access," the entire disclosure of which application is hereby incorporated herein by reference.

Figure 5:
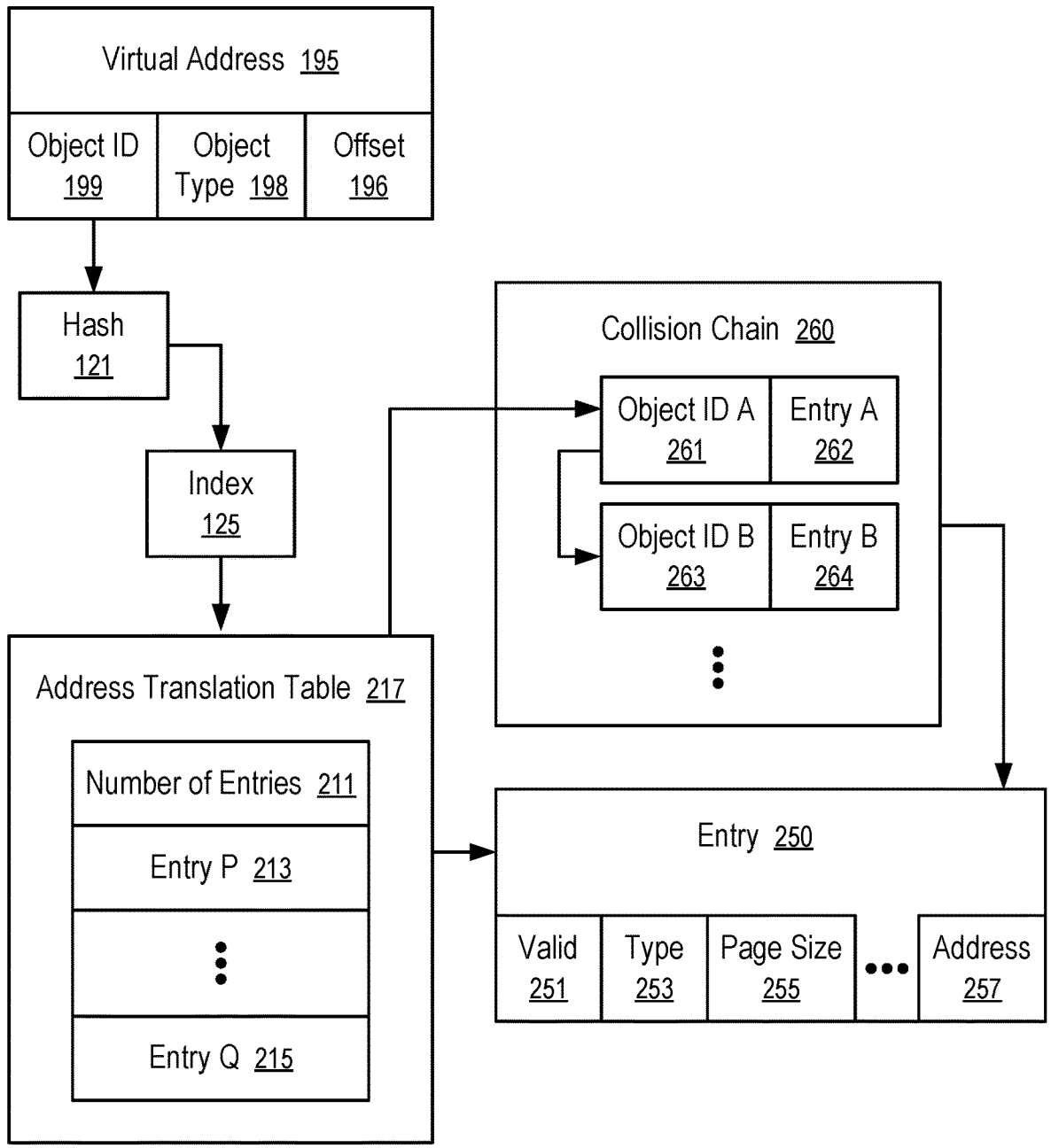
FIG. 5 shows a technique to retrieve an entry from an address translation table to convert a virtual address.

In some instances, a memory address and/or the object ID (e.g., 199) of the memory address can include a portion representing an object type (e.g., 198 illustrated in FIG. 5). For example, an object type (198) of a value from 0 to 3 can be used to identify a kernel object of an operating system. For example, an object type (198) of a value of 4 to 5 can be used to specify that the offset is an address of different widths (e.g., a 64-bit address or 32-bit address included within the memory address that has 128 bits). For example, an object type (198) of a value of 6 to 7 can be used to specify that a predetermined portion of the object ID is to be interpreted as an identifier of a local object or an object in Partitioned Global Address Space (PGAS). For example, an object type (198) of a value of 32 can be used to specify that the remaining portion of the object ID is to be interpreted as an identifier of an object defined in a server (e.g., 197). For example, an object name server can store data indicating the name of an object represented by an object ID, access control parameters of the object, and/or other attributes of the object.

For example, the object ID (199) of the memory address used to load the routine for execution can have attributes stored in the object name server; and the attributes can be used to determine or infer the current domain of the routine loaded from the memory address.

In some instances, a routine to be executed in the processor (169) can have attributes that are stored in association with the routine (e.g., in the memory (109), in a page table entry for the determination of a physical address of the instruction, in an entry table for making calls for the execution of routines). When the routine is loaded for execution, the attributes of the routine are used to determine the current domain for the execution of the routine.

Figure 2:
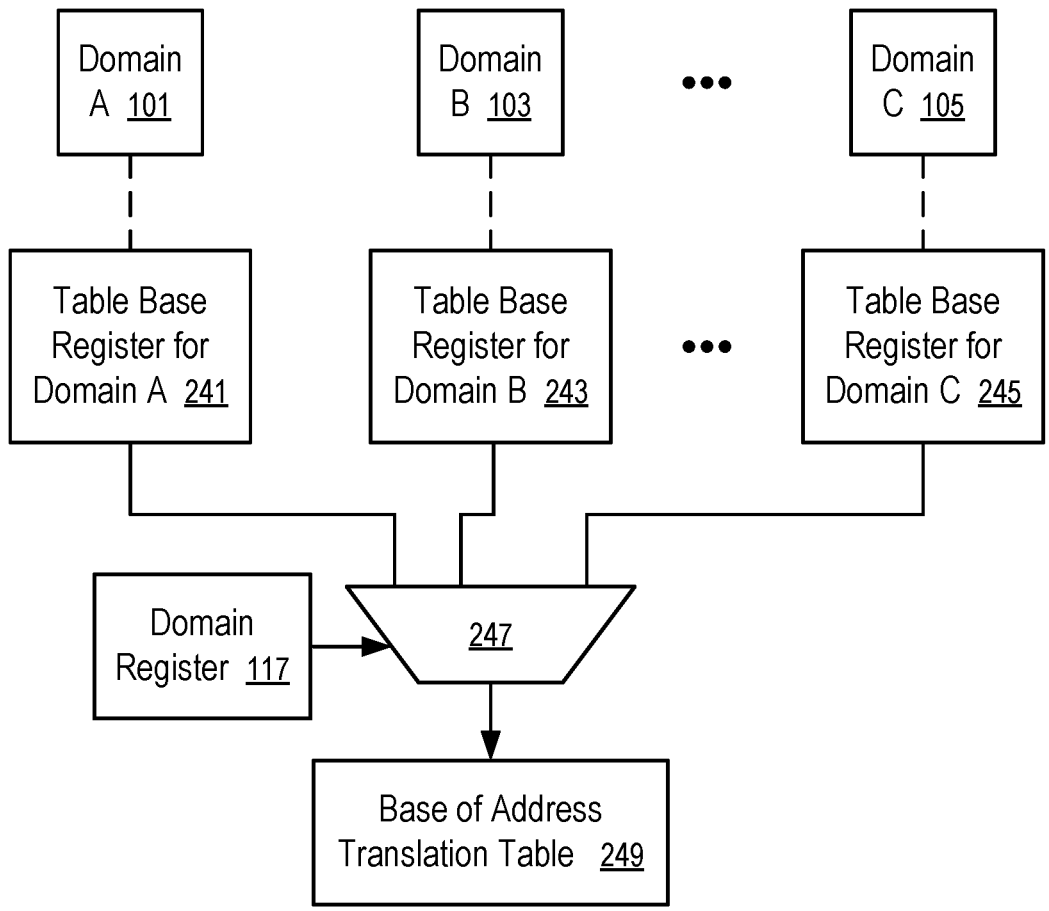
FIG. 2 illustrates the identification of a table base of an address translation table in absence of an operating hypervisor in some embodiments.

In one embodiment, when the hypervisor status register (233) indicates the absence of a hypervisor, the processor (169) configures the memory management unit (MMU) (181) to identify a table base of an address translation table in accordance with FIG. 2. However, when the hypervisor status register (233) indicates the presence of a hypervisor (102), the processor (169) configures the memory management unit (MMU) (181) to identify a table base of an address translation table in accordance with FIG. 3. FIG. 5 shows a technique to retrieve an entry from an address translation table to convert a virtual address to a physical address.

FIG. 2 illustrates the identification of a table base (249) of an address translation table in absence of an operating hypervisor in some embodiments.

In FIG. 2, separate table base registers (241, 243, . . . , 245) are configured for the different domains (101, 103, . . . , 105) respectively.

The domain register (117) of the processor (169) stores the identifier of a current domain in which the processor (169) is currently executing instructions. The domain register (117) is coupled to a multiplexer (247) to select, as the table base (249) of address translation table used in the address translation. The table base (249) identifies a memory location of an address translation table that is to be used to perform address translation (235) in the memory management unit (MMU) (181) (e.g., as discussed below in connection with FIG. 5 and/or FIG. 7).

FIG. 2 shows an example of a processor having multiple table base registers (241, 243, . . . , 245).

Alternatively, or in combination, each domain (101, 103, . . . , or 105) can have a separate memory area configured to store the values of domain specific registers used for instruction execution in the respective domain (101, 103, . . . , or 105).

For example, each domain (101, 103, . . . , or 105) can have a separate memory area storing the domain specific values of registers used during the execution of the last executed instruction, before the execution transitions temporarily across into another domain (e.g., via a domain call instruction to execute a routine in another domain). Such a separate memory area for storing the values of registers specific to a particular domain (e.g., 101) is accessible for instruction execution in the respective domain (e.g., 101) but not accessible for instruction execution in other domains (e.g., 105). Since other domains (e.g., 101) are prevented from accessing the register value region of a given domain (e.g., 105), the register states of the given domain (e.g., 105) are isolated and protected from executions in the other domains (e.g., 101).

For example, the memory area for domain specific values of registers of a particular domain (e.g., 101) can store the value of the program counter (PC) of instructions being executed in the processor, the value of the stack pointer (SP) of a stack for instruction execution, the value of the frame pointer (FP) of the stack, the value of the argument pointer (AP) for the stack, and/or the value of the processor status word (PSW), etc. The value of the table based register for the particular domain (e.g., 101) can also be saved in the register value region of the particular domain (e.g., 101). In such an implementation, it is not necessary to configure separate registers (241, 243, . . . , 245) for the domains (101, 103, . . . , 105) respectively. A single register can be used to store the table base for the current domain (e.g., 101, 103, . . . , 105) as indicated by the domain register (117); and when the execution enters a new domain, the register can be updated using the table base previously stored in the register value region of the new domain. Alternatively, the content of the domain register (117) can be used as an index in a table of table bases to look up the base (249) of address translation table.

In one embodiment, when a domain (101) is specifically configured for hypervisor (102), the absence of a hypervisor, as indicated by the hypervisor status register (233), allows the processor (169) to skip the table base register for the domain (101) of hypervisor (102); and the domain (101) of hypervisor (102) becomes not relevant to the subsequent operations of the processor (169) (e.g., until the hypervisor status register (233) is changed during a subsequent powering up/bootstrap process).

Figure 3:
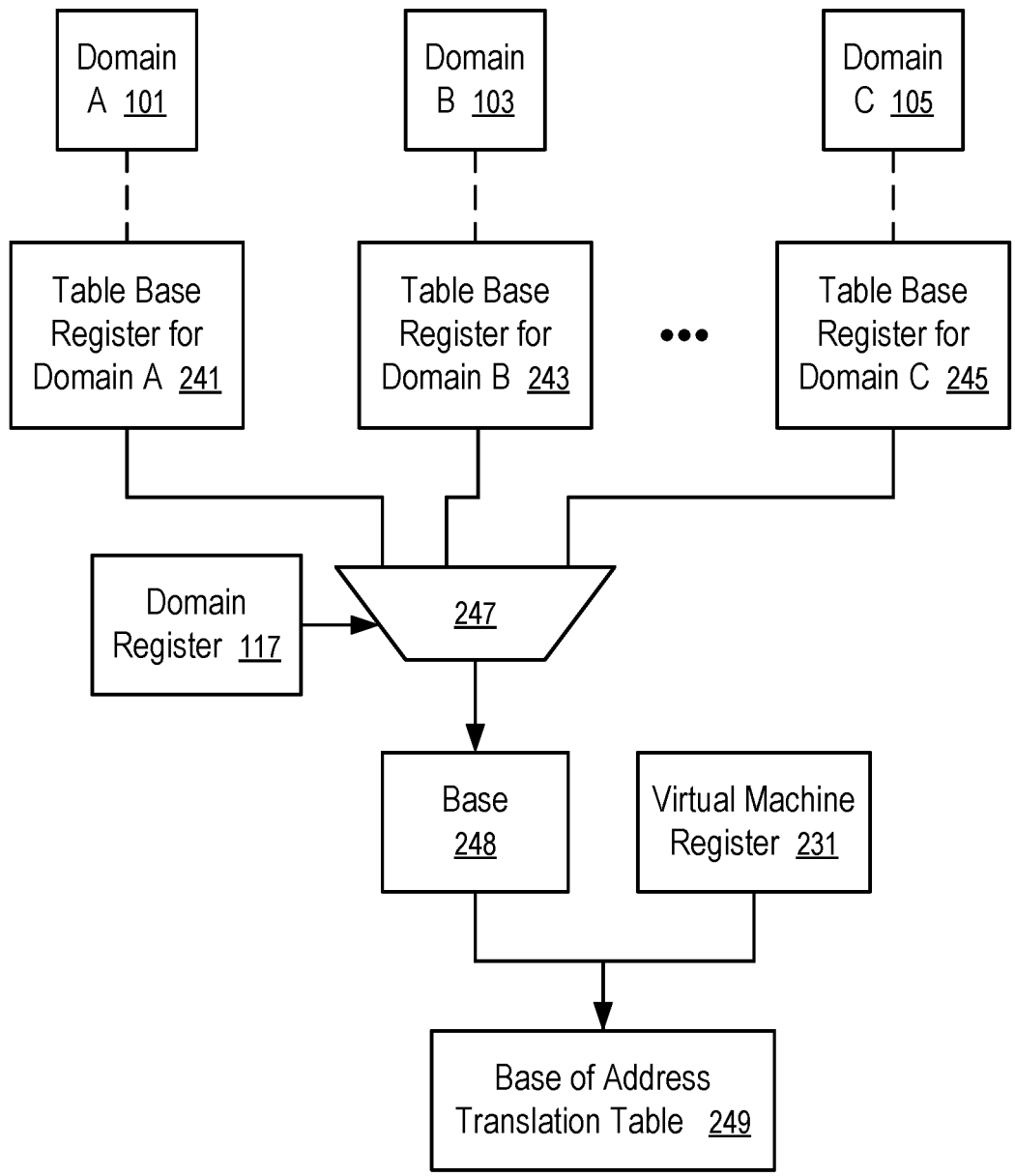
FIG. 3 illustrates the identification of a table base of an address translation table in the presence of an operating hypervisor in some embodiments.

FIG. 3 illustrates the identification of a table base (249) of an address translation table in the presence of an operating hypervisor (102) in some embodiments.

In FIG. 3, an intermediate base (248) is selected by the multiplexer (247) as an output from the table base registers (241, 243, . . . , 245). The intermediate base (248) is further combined with the content of the virtual machine register (231) to generate the table base (249) of address translation table.

In general, for each execution domain (101, 103, . . . , 105) and each virtual machine hosted in the computer system of FIG. 1, a separate address translation table can be created for the conversion of virtual addresses assigned by the operating system (104) to physical addresses. When an operating hypervisor (102) is present in the computer system, the operating system (104) running in a virtual machine uses pseudo-physical addresses in that the operating system (104) allocates the pseudo-addresses for virtual memory addresses in a way as if the pseudo-addresses were physical addresses, since the operating system (104) cannot tell apart a virtual machine provided by the hypervisor (102) from a physical machine. The hypervisor (102) can translate the pseudo-physical addresses allocated by the operating system (104) running in a virtual machine to the physical address of the memory (109) in the computer system (e.g., illustrated in FIG. 1).

Preferably, the hypervisor (102) performs the translation at the time of the creation of a page table entry mapping a page of virtual memory addresses and a page of physical addresses. Since the operating system (104) running in a virtual machine operates on pseudo-physical addresses, the page table entry specified by the operating system maps the page of virtual memory addresses to a page of pseudo-physical addresses. The hypervisor (102) can translate the page of pseudo-physical addresses to a page of physical addresses assigned to the virtual machine such that the page table entry can subsequently be used to translate the virtual addresses directly into the physical addresses assigned to the virtual machine. Such a page table entry modified by the hypervisor (102) can improve the memory access performance in the presence of an operating hypervisor (102) by eliminating the need to separately translate a pseudo-physical address in a virtual machine to a physical address for the physical memory (109) at the time of the usage of a virtual address.

For example, when the operating system (104) executes an instruction to create a page table entry to map a virtual memory page to a pseudo-physical memory page, the instruction can be trapped to cause the hypervisor (102) to translate the pseudo-physical memory page to a physical memory page and modify the page table entry to map the virtual memory page to the translated physical memory page. Subsequently, the page table entry can be used to directly translate the virtual memory page to the physical memory page.

The content of the virtual machine register (231) can be combined with the base (248) via a table to look up the base (249) specific to a virtual machine identified by the virtual machine register (231). Alternatively, the content of the virtual machine register (231) can be used as part of the input for a hash function (e.g., 121 illustrated in FIG. 5) to index into a table at the base (248) to retrieve a virtual machine specific entry of an address translation table (249), as further discussed below in connection with FIG. 5.

For example, for a particular domain (e.g., 103), the processor (169) can store a table of table bases of the virtual machines hosted in the computer system. The table base register (e.g., 243) of the domain (e.g., 103) can store the base (248) of the table of table bases for the virtual machines. The content of the virtual machine register (231) can be used as an index into the table at the base (248) to look up the base (249) of an address translation table that is specify for the domain (e.g., 103) and for the virtual machine identified by the virtual machine register (231).

FIG. 3 shows an example of a processor having multiple table base registers (241, 243, . . . , 245).

Alternatively, or in combination, each domain (101, 103, . . . , or 105) can have a separate memory area configured to store the domain specific values of registers used for instruction execution in the respective domain (101, 103, . . . , or 105), as discussed above in connection with FIG. 2. The values of the table base registers (241, 243, . . . , 245) can be stored in the register value region of the respective domains (e.g., 101, 103, . . . , 105). In such an implementation, it is not necessary to configure separate registers (241, 243, . . . , 245) for the domains (101, 103, . . . , 105) respectively. A single register can be used to store the base (248) retrieved from the register value region of the respective domains (e.g., 101, 103, . . . , 105). In some implementations, the base (248) is further combined with the content of the virtual machine register (231) to obtain the base (249) of address translation table and update that register to hold the base (249) for address translation (235). Alternatively, separate registers are used to store the intermediate base (248) and the base (249) of address translation table to avoid the need to reload the base (248) from the register value region of the respective domains (e.g., 101, 103, . . . , 105) when the content of the virtual machine register (231) changes. The register value regions of the domains (101, 103, . . . , 105) are be cached in the internal cache (187) to facilitate efficient state changes of the processor (169) in response to the changes in the domain register (117) and/or the virtual machine register (231). Alternatively, the content of the domain register (117) and the content of the virtual machine register (231) can be combined as an index in a table of table bases to look up the base (249) of address translation table.

Figure 4:
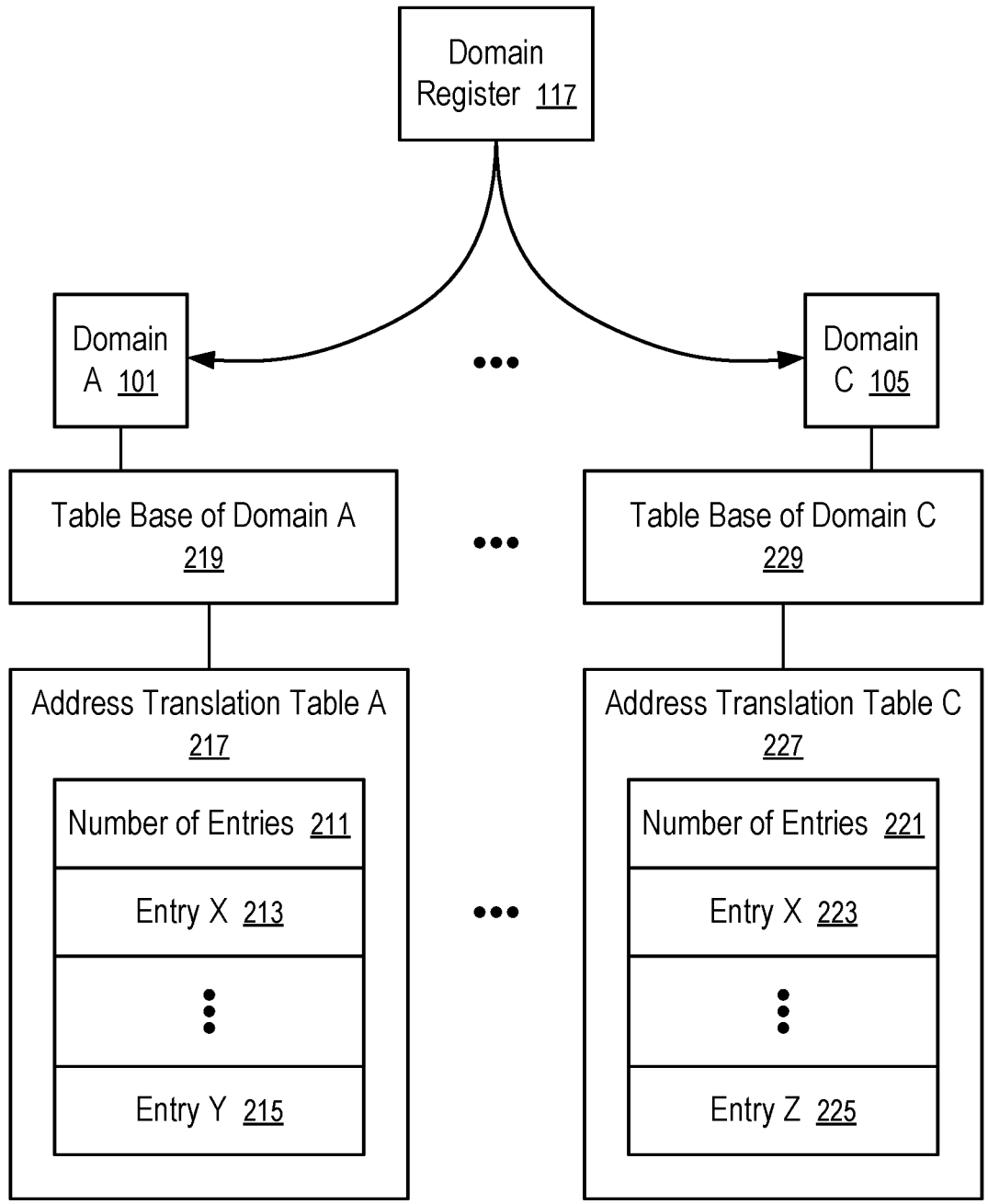
FIG. 4 illustrates separate address translation tables for respective domains.

FIG. 4 illustrates separate address translation tables (217, . . . , 227) for respective domains (101, . . . , 105).

In FIG. 4, the domain register (117) can store an identifier of a current domain of instruction execution in the processor (169) of FIG. 1. For example, the content of the domain register (117) can identify domain A (101) or domain C (105).

Each of the domains (101, . . . , 105) has a corresponding table base (219, . . . , 229) that identifies the memory location of a respective address translation table (217, . . . , 227).

For example, when the hypervisor status register (233) indicates the absence of an operating hypervisor (102) in the computer system, the table bases (219, . . . , 229) can be loaded from the register value regions of the respective domains (101, . . . , 105) and/or retrieved from respective registers (241, . . . , 245), as discussed above in connection with FIG. 2.

When the hypervisor status register (233) indicates the presence of an operating hypervisor (102) in the computer system, the table bases (219, . . . , 229) can be loaded for a particular virtual machine identified by the virtual machine register (231) from the register value regions of the respective domains (101, . . . , 105) and/or looked up for the particular virtual machine using table bases retrieved from respective registers (241, . . . , 245), in a way similar to that discussed above in connection with FIG. 3.

Alternatively, when the hypervisor status register (233) indicates the presence of an operating hypervisor (102) in the computer system, the table bases (219, . . . , 229) can be loaded from the register value regions of the respective domains (101, . . . , 105); and the content of the virtual machine register (231) can be used to generate an index into the address translation tables (217, . . . , 227) at the table bases (219, . . . , 229).

In FIG. 4, each address translation table (217, . . . , or 227) stores a number/count (211, . . . , or 221) of entries the respective table (217, . . . , or 227) has. The number/count (211, . . . , or 221) allows the processor (169) to check whether an index used on the address translation table (217, . . . , or 227) is within the valid bound defined by the number/count (211, . . . , or 221).

During the translation of a virtual address to a physical address, an index is generated from and/or for the virtual address to retrieve an entry that facilities the translation of the virtual address to the physical address. FIG. 5 illustrates an example of the generation of the index in address translation (235).

FIG. 5 shows a technique to retrieve an entry (250) from an address translation table (217) to convert a virtual address (195).

The virtual address (195) can include an object ID (199), an object type (198), and an offset (196). For example, the virtual address (195) can have a width of 128 bits; a number of bits (e.g., 59 or 58) of the virtual address (195) can be used to store the object ID (199), another number of bits (e.g., 5 or 6) of the virtual address (195) can be used to store the object type (198), and the remaining bits (e.g., 64) of the virtual address can be used to store the offset (196) relative to the object that has the type (198) and the ID (199). For example, the virtual address (195) can be an address stored in the memory (109), as configured, programmed, and/or seen by a programmer or user of a routine in a domain (e.g., 105).

In FIG. 5, a hash (121) is applied on the object ID (199) to generate an index (125). The index (125) has a less number of bits than the object ID (199) and thus reduces the size of the address translation table (217) for looking up an entry (e.g., 213, . . . , 215) from the table (217). However, hash collision can occur when multiple items are hashed into a same index. Chaining is one of the techniques to resolve hash collisions. The index resulting from a collision can be used to retrieve a list/chain of key-value pairs. Each item that is hashed into the index can be configured as the key in a corresponding key-value pair in the list; and the look up result for the item can be configured as the value in the corresponding key-value pair. To retrieve the look up result of one of the items that are hashed into the same index, the list/chain of key-value pairs identified via the index can be searched to find a key-value pair where the key matches with the item. The value of the matching key-value pair provides the look up result. When there is no hash collision for the index (125), the entry (e.g., 213, . . . , or 215) at the index (125) in the address translation table (217) can be retrieved as the resulting entry (250). When there is hash collision for the index (125), the entry (e.g., 213, . . . , or 215) at the index (125) in the address translation table (217) identifies a collision chain (260). The collision chain (260) has a list/chain showing the entries (e.g., 262, 264, . . . ) for the object IDs (e.g., 261, 263) that are hashed (121) into the same index (125). The collision chain (260) can be searched to locate the entry (e.g., 262, or 264) that is specified for an object ID (e.g., 261 or 263) that matches with the object ID (199) before the hash (121). The located entry (e.g., 262, or 264) is illustrated as the resulting entry (250).

In general, the hash (121) can be applied to a combination of the object ID (199), optionally the object type (198), a portion of the offset, the content of the virtual machine register (231), and/or other information, such as the processor ID of the current process running in the processor (169) and/or the content of the domain register (117). In some instances, the content of the domain register (117) and/or the content of the virtual machine register (231) can be appended/added to the result of the hash (121) to generate the index (125).

A typical entry (250) looked up from the address translation table (217) using the index (125) can have fields for subsequent operations in address translation (235). For example, a valid field (251) can have a value indicating whether the entry (250) is a valid for address translation; a type field (253) can have a value indicating a type of translation to be performed using the entry; a page size field (255) can have a value indicating the memory page size for the determination of a page table entry; an address field (257); etc. For example, the entry (250) can further include a field identifying the page table structure, and/or a field specifying security configuration (e.g., 107 illustrated in FIG. 6) for accessing the memory region corresponding to the entry (250).

The address (257) provided in the entry (250) of the address translation table (217) can be the memory address of a page table or page directory. At least a portion of the offset (196) can be used as a virtual page number and an index in the page table or page directory to look up the next page table or page directory. The process of looking up the next page table or page directory can be repeated, until an entry looked up using the last virtual page number in the offset (196) is used to locate a page table entry (e.g., 153 illustrated in FIG. 7). A base (157) of a physical memory page identified in the page table entry (153) can be combined with the remaining portion of the offset (196) (e.g., as the offset (147) illustrated in FIG. 7) to generate a physical address (e.g., 159 illustrated in FIG. 7).

Optionally, the hash (121) can be applied to the entire virtual address (195) such that the address (257) looked up using the index (125) is a physical address. In such an implementation, the entry (250) can be considered as a page table entry and can include security configuration (e.g., 107 illustrated in FIG. 6) for the memory address. However, such an implementation can require a large address translation table (217).

Figure 7:
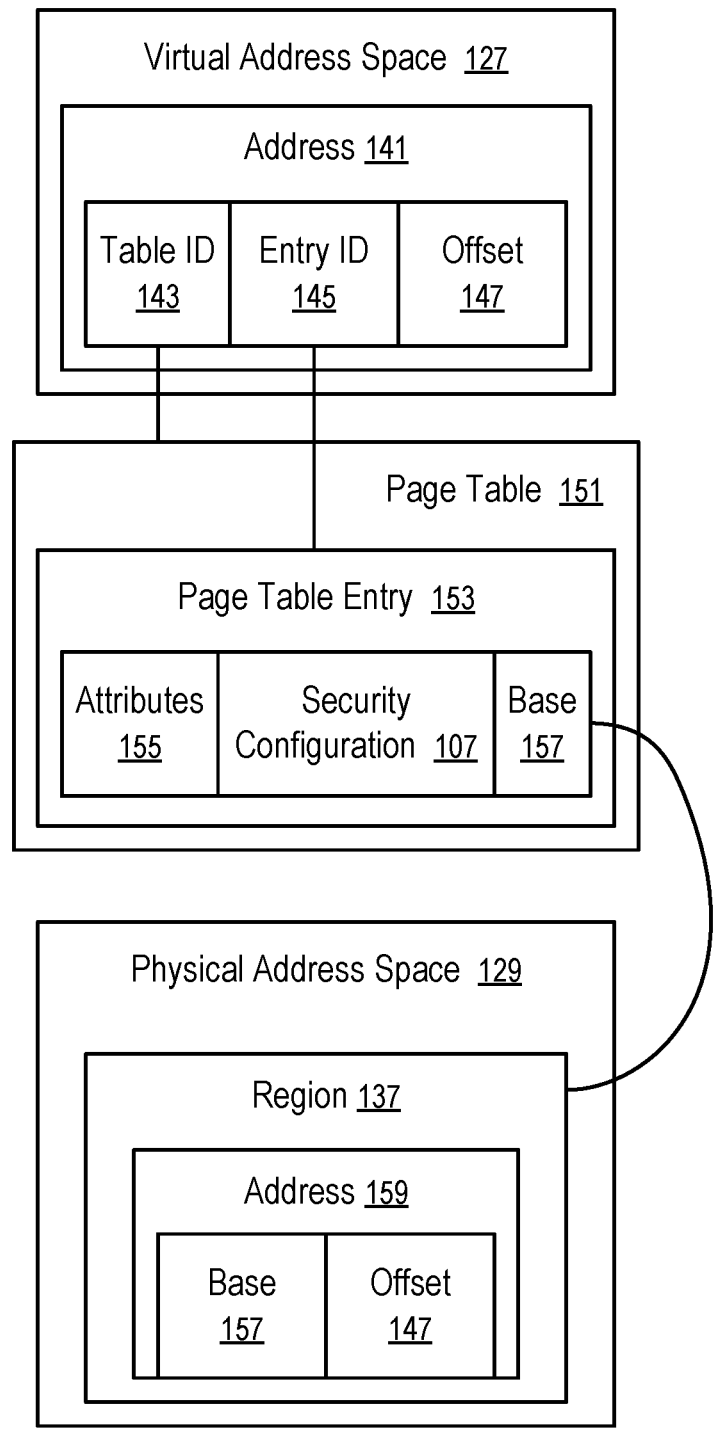
FIG. 7 illustrates a page table entry having a security configuration for execution domains.

Alternatively, the hash (121) can be applied to a combination of the object ID (199), optionally the object type (198), and a portion of the offset (196); and the address (257) looked up using the index (125) is a base (e.g., 157 illustrated in FIG. 7) of a page of physical addresses. The remaining portion of the offset (196) can be combined with the base (e.g., as illustrated in FIG. 7) to generate the physical address (e.g., 159). In such an implementation, the address translation table (217) can be considered as a page table (e.g., 151 illustrated in FIG. 7); the portion of the address (195) used to generate the index (125) from hashing (121) can be considered an entry ID (e.g., 145 illustrated in FIG. 7) or a virtual page number (VPN); and the entry (250) can be considered as a page table entry (e.g., 153 illustrated in FIG. 7) and can optionally include a security configuration (e.g., 107) for the memory address.

Alternatively, the hash (121) can be applied to a combination of the object ID (199), optionally the object type (198), and a portion of the offset (196); and the address (257) in the entry (250) looked up using the index (125) is the physical address of a page table (e.g., 153 illustrated in FIG. 7). Since the entry (250) identifies a page table (e.g., 153), the portion of the address (195) used to generate the index (125) from hashing (121) can be considered a table ID (e.g., 143 illustrated in FIG. 7). A portion of the offset (196) can be used as an entry ID (145) or a virtual page number (VPN) in the page table (e.g., 153) to look up the page table entry (e.g., 153) that contains the base (157) of a memory page or memory region (137); and the remaining portion of the offset (196) can be combined with the base (157) to generate the physical address (159).

Alternatively, the hash (121) can be applied to a combination of the object ID (199), optionally the object type (198), and a portion of the offset (196); and the address (257) in the entry (250) looked up using the index (125) is the address of a page directory. The offset (196) can have one or more virtual page numbers for one or more page directories or page tables. A virtual page number (VPN) in the offset (196) is used to index into the page directory to look up the base of a subsequent page directory or page table. The last virtual page number (VPN) in the offset (196) is used to index into a page table (e.g., 153) to retrieve the page table entry (153) containing the base (157) of the memory region (137). In such an implementation, the leading portion of the address (195), including the virtual page number (VPN) before the last virtual page number (VPN) can be considered a table ID (143).

In some instances, when different object IDs are hashed to generate the same index (125), a collision chain (260) can be used to identify a unique address associated with each of the object IDs. In such a situation, the address (257) can be used to identify a table, list, or chain storing the collision chain (260), from which a unique entry (e.g., 262, or 264) for address translation for the object ID (199) can be located. The unique entry (e.g., 262, or 264) looked up from the collision chain (260) can have a structure similar to the entry (250) looked up directly from the address translation table (217) without collision.

In some implementations, different processes running in the computer system illustrated in FIG. 1 can have different virtual address spaces and thus different entries in the address translation table (217). In such a situation, the process ID can be combined with a portion of the address (195) for the hash (121) to generate the index (125). Optionally, the object ID (199) includes or indicates the process ID.

In some implementations, different virtual machines use different page tables or page directories looked up from the address translation table (217). Thus, the content of the virtual machine register (231) can be combined with the object ID (199) and/or a further portion of the virtual address (195) to generate the index (125) through the function of the hash (121).

The domain register (117) of the computer processor (169) can be used to store the domain identifier of the routine that is currently being executed in the computer processor (169). For example, upon the execution of an instruction that causes domain crossing, the content of the domain register (117) can be updated to store the domain identifier specified in the instruction, after the instruction is successfully processed. The content of the domain register can control various security operations of the processor (169).

For example, when the execution of an instruction results in a request to access a memory location identified using a virtual memory address, the virtual memory address can be translated to a physical memory address using one or more page tables. The content of the domain register can be used to select, from a page table entry, a permission bit for the memory access made in the current domain. The selected permission bit can control the processing of the request to access a memory unit identified by the virtual memory address.

For example, when a call is made to execution a routine having a virtual memory address, the content of the domain register can be used to select a security bit from a page table entry that is used to translate the virtual memory address to a physical memory address. The security bit is selected for executing the routine in providing services for the current domain identified by the domain register. The selected security bit controls security operations of separating resources and/or data between the called routine and the calling routine.

For example, when the execution of an instruction generates a request to access a privileged register, the content of the domain register can be used to select, from a permission register for example, a permission bit for the current domain to access the privileged register. The permission bit can control the acceptance or rejection of the request to access the privileged register.

Figure 6:
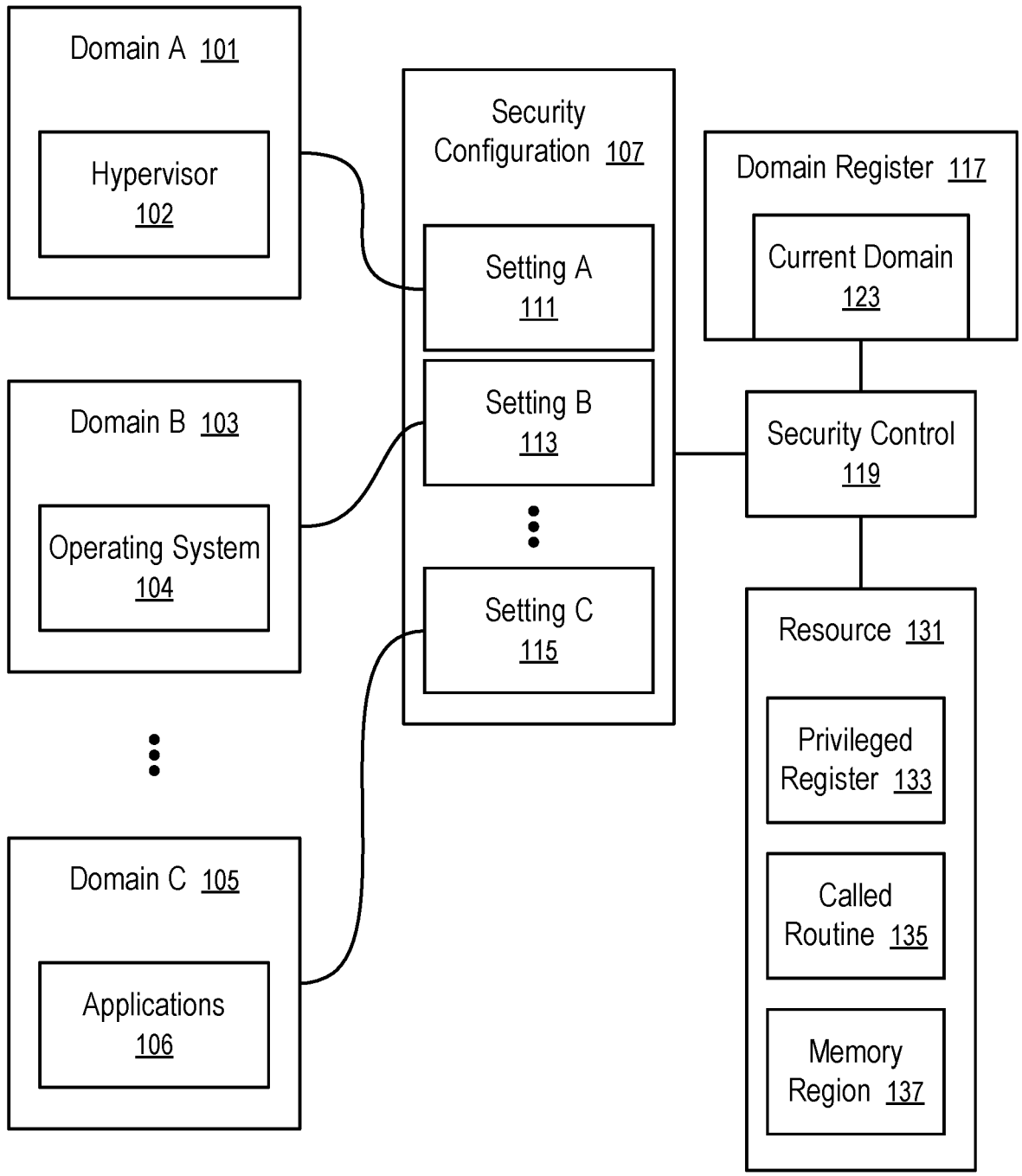
FIG. 6 shows a system to control security operations applied to resources in accordance with a domain register.

FIG. 6 shows a system to control security operations applied to resources (e.g., 131) in accordance with a domain register (117).

In FIG. 6, a security control (119) is implemented based on the current domain (123) specified in the domain register (117), and the security configuration (107) having settings (111, 113, ..., 115) specified separately for the predefined domains (101, 103, ..., 105) respectively. The security control (119) is applied to a resource (131), which can be a privileged register (133), a called routine (135), a memory region (137), etc.

The security configuration (107) can have settings (111, 113, ..., 115) for the domains (101, 103, ..., 105) respectively, without relying upon a static hierarchy of trust among the domains (101, 103, ..., 105).

During the executing of a routine in the processor (169), the domain register (117) causes the security control (119) to select a setting (e.g., 111, 113, ..., or 115) that is pre-associated with a domain (e.g., 101, 103, ..., or 105) matching with the current domain (123). The selected setting (e.g., 111, 113, ..., or 115) is used by the security control (119) to customize security operations for the resource (131).

For example, when the execution of an instruction) of the routine in the processor (169) requests memory access to the memory region (137), the selected setting (e.g., 111, 113, ..., or 115) having its pre-associated domain (e.g., 101, 103, ..., 105) matching the current domain (123) is used by the security control (119) to determine whether the memory access permissible.

For example, different regions (e.g., 137) in the memory (109) can be configured with different security configurations (e.g., 107); and each security configuration (e.g., 107) can include different permissions (e.g., 111, 113, ..., 115) for different domains (101, 103, ..., 105). The security configuration (107) can be specified, for example, in a page table entry used in logical to physical address translation of virtual memory addresses, such that the structure of the memory regions can correspond to the memory page structure, as further discussed below in connection with FIG. 7.

For example, the physical memory (109) can be divided into multiple regions; each region (e.g., 137) can be a page of physical memory (109) for memory management, or a set of pages of physical memory (109).

For example, a typical memory region (137) can have a respective security configuration (107) specified for the set of predefined domains (101, 103, ..., 105). The security configuration (107) explicitly identify the permissions (e.g., 111, 113, ..., 115) for the domains (101, 103, ..., 105) respectively. Thus, the privileges of routines to access the memory region (137) are not dependent on a hierarchy of the domains (102, 103, ..., 105).

In one example, when a routine executed in the current domain (123) causes memory access to the memory region (137) for read, write, or execution of instructions, the domain register (117) causes the security control (119) to check the permission specified in the setting (111, 113, ..., or 115) that is corresponding to the current domain (123). Whether to block (or reject) an access to the memory region (137) for a particular type of operations (e.g., read, write, execution) by the execution of an instruction of the routine in the current domain (123) can be determined based on a respective permission bit that is selected according to the current domain (123) for the memory region (137), and for the type of operations. Some details and examples of permissions for memory access to the memory region (137) can be found in U.S. Pat. App. Ser. No. 62/724,896, filed on Aug. 30, 2018 and entitled "Memory Access Control through Permissions Specified in Page Table Entries for Execution Domains," the entire disclosure of which application is hereby incorporated herein by reference.

In general, different routines of a same domain (e.g., 103) can be configured to in different memory regions and thus configured to have different permissions and security settings for the same domain (e.g., 103).

Further, a routine can be configured to store different portions of its data in different memory regions (e.g., 137) and thus configured to have different permissions for accessing from a same domain (e.g., 101, 103, ..., or 105).

In another example, when a routine executed in the current domain (123) calls a called routine (135) stored in the memory region (137) for execution, the domain register (117) causes the security control (119) to check the permission specified in the setting (111, 113, ..., or 115) that is corresponding to the current domain (123). Whether or not to deploy a security measure to protect the resources of the calling routine against the called routine (135) and/or protect the resources of the called routine (135) against the calling routine can be determined based on a respective permission bit that is specified for the current domain (123) and for the memory region (137).

Security measures can include sandboxing. Sandboxing in general includes a computer security measure that isolates the execution of a set of instructions (e.g., an application) from certain system resources and/or other sets of instructions/programs. For example, sandboxing can be implemented using a shadow stack structure where the calling routine and the called routine are configured to use separate stacks and control registers related to the stacks, the calling routine can be prevented from accessing the stack assigned to the called routine, and the called routine can be prevented from accessing the stack assigned to the calling routine. Some details and examples of a shadow stack structure can be found in U.S. Pat. App. Ser. No. 62/724,913, filed on Aug. 30, 2018 and entitled "Security Configurations in Page Table Entries for Execution Domains," the entire disclosure of which application is hereby incorporated herein by reference.

For example, the security configuration (107) of a typical memory region (137) can have sandboxing settings (e.g., 111, 113, . . . , 115) specified for the set of predefined domains (e.g., 101, 103, . . . , 105) respectively. The sandboxing configuration (107) explicitly identifies whether or not a sandboxing operating is required for a call to execution a called routine (135) stored in the region (137). Calls to execute the same routine (135) from routines executed in the different domains (101, 103, . . . , 105) can have different settings (111, 113, . . . , 115); and the settings (111, 113, . . . , 115) specify whether the calls from the respectively domains (101, 103, . . . , 105) require sandboxing (e.g., to protect the called routine (135) and the calling routine from each other). Thus, the sandboxing operations can be selectively applied for the execution of the called routine (135) stored in the memory region (137), based on the current domain (123) identified in the domain register (117) and the explicit settings (e.g., 111, 113, . . . , 115) configured for the respective domains (101, 103, . . . , 105), without relying upon a predefined hierarchy of domains (102, 103, . . . , 105).

For example, a calling routine in the current domain (123) can call the called routine (135). Whether to invoke a sandboxing operation for the call to execute the called routine (135) stored in the memory region (137) can be determined based on the sandbox setting (e.g., 111, 113, . . . , or 115) that is specified for the respective domain (e.g., 101, 103, . . . , or 105) matching with the current domain (123) for the memory region (137). Thus, the sandboxing operation can be invoked independent of a relative hierarchy between the domain of the called routine (135) and the current calling domain (123).

The sand box settings (107) for routines stored in the memory region (137) can be specified, for example, in a page table entry used in logical to physical address translation of virtual memory addresses, such that the structure of the memory regions can correspond to the memory page structure, as further discussed below in connection with FIG. 7.

In a further example, when a routine executed in the current domain (123) requests access to a privileged register (133), the domain register (117) causes the security control (119) to check the permission specified in the setting (111, 113, . . . , or 115) for the privileged register (133). Whether to permit or block the access can be determined based on a respective permission bit that is specified for the current domain (123) and for the privilege register (133).

For example, the privileged register (133) can have different permissions (111, 113, . . . , 115) for the different domains (101, 103, . . . , 105) respectively. When an instruction executed in the current domain (123) requests to access the register privileged (133), the domain register (117) causes the security control (119) to select a respective permission (e.g., 111, 113, . . . , or 115) corresponding to the current domain (123) to control the access.

The register (133) can have explicit permissions (111, 113, . . . , 115) specified separately for the domains (101, 103, . . . , 105) respectively (e.g., non-hierarchical), without relying upon a predefined hierarchy of trust for the domains (102, 103, . . . , 105).

In some instances, the privileged register (133) can be accessed for different types of operations, such as read, write, execution, etc. The permission (e.g., 111, 113, . . . , or 115) for a particular domain (e.g., 101, 103, . . . , or 105) to access the privileged register (133) can have separate permission bits for the respective types of operations (e.g., read, write, and/or execution).

The security configuration (107) can be configured to allow an instruction running in one domain (e.g., 101, 103, . . . , 105) to access the register (133) for one type of operations (e.g., read) but not for another type of operations (e.g., write).

The security configuration (107) can be configured to allow an instruction executing in one domain (e.g., 103) to access the register (e.g., 133) via one permission setting (e.g., 113) for the domain (e.g., 103), but prohibit the same instruction running in another domain (e.g., 101) from accessing the register (133) via another concurrent setting (e.g., 111) for that domain (e.g., 101), even when the disallowed domain (e.g., 101) can be more privileged (and thus trusted) than the allowed domain (e.g., 103) in traditional protection rings.

In one implementation, the security configuration (107) is hardwired in a processor for the privileged register (133). In another implementation, the security configuration (107) can be set via firmware for the register (133) of a processor during a start-up/boot up process of a computer system. In a further implementation, the security configuration (107) can be changed via privileged software during the normal operations of the computer system.

For example, the security configuration (107) for the privileged register (133) can be changed when the processor (169) switches from running a program in one domain (e.g., 101) to running a program in another domain (e.g., 103).

For example, the security configuration (107) for the privileged register (133) can be changed in accordance with a request when the computer system switches from running one routine to another routine, where the routines can be in the same domain (e.g., 101).

For example, the security configuration (107) for the privileged register (133) can be configured in a permission register that controls access to the privileged register (133) using permission bits stored in the permission register; and the content of the permission register can be updated by an authorized process to adjust/customize the security level of the computer system for the current computation. Alternatively, permissions bits for different domains (101, 103, . . . , 105) can be specified in separate registers that correspond to the domains (101, 103, . . . , 105) respectively. Some details and examples of permission registers can be found in U.S. Pat. App. Ser. No. 62/724,929, filed on Aug. 30, 2018 and entitled "Access Control for Processor Registers based on Execution Domains," the entire disclosure of which application is hereby incorporated herein by reference.

Since the security control system of FIG. 6 does not rely upon a predefined domain hierarchy of trust (i.e., non-hierarchical), it can provide better flexibility and finer control granularity than the conventional protection rings.

FIG. 7 illustrates a page table entry (153) having a security configuration (107) for execution domains (e.g., 101, 103, . . . , 105).

For example, the security configuration (107) in the page table entry can be permissions for accessing the memory region (137) identified by the page table entry (153) and/or sandboxing configuration for calling routines stored in the memory region (137) that is identified by the page table entry (153).

A typical virtual address (141) in a virtual address space (127) can be translated into a corresponding physical address (159) in a physical address space (129) using a page table (151). In general, multiple page tables (e.g., 151) can be used to map the virtual address space (127) to the physical address space (129).

The virtual address (141) can include a table ID (143), an entry ID (145), and an offset (147). The table ID (143) can be used to identify a page table (151) that contains a page table entry (153) for a page that contains the memory unit that is identified by the virtual address (141) and the physical address (159). The entry ID (145) is used as an index into the page table (151) to locate the page table entry (153) efficiently. The page table entry (153) provides a base (157) of the physical address (159). Physical addresses in the same page of memory share the same base (157). Thus, the base (157) identifies the region (137) in the memory (109). The offset (147) of the virtual address (141) is used as a corresponding offset (147) in the page or region (137) in the memory (109). The combination of the base (157) and the offset (147) provides the physical address (159) corresponding to the virtual address (141).

In FIG. 7, the page table entry (153) specifies not only the base (157) for the page or region (137), but also the security configuration (107) for the page or memory region (137), such as permissions for reading data into the memory region (137) corresponding to the base (157), permissions for writing data into the memory region (137), permissions for executing instructions stored in the memory region (137), sandboxing requirements for calling routines stored in the memory region (137). The security configuration (107) can have separate settings (111, 113, . . . , 115) respectively for the predefined, non-hierarchical domains (101, 103, . . . , 105) illustrated in FIGS. 1 and 6. The current domain (137) in the domain register (117) controls which one of the settings (111, 113, . . . , 115) is used for a current memory access, or a current call to a routine (135) stored in the memory region (137).

Optionally, the page table entry (153) can specify other attributes (155) of the page of physical memory, such as whether the data in the page is valid, whether the page is in main memory, whether the page is dirty (e.g., the changes in data in the page of physical memory have not yet been flushed to a longer-term memory/storage device relative to the memory region (137)). For example, the attributes (155) can include a page fault bit indicating whether the page is in the main memory of the computer or in a storage device of the computer. If the permissions in the security configuration (107) allow the current access to the page of memory and the page fault bit indicate that the page is currently not in the main memory of the computer, the memory management unit (181) can swap the page from the storage device into the main memory of the computer to facilitate the access to the page identified by the page table entry (153). However, if the permissions in the security configuration (107) deny the current access to the page for the current execution domain, it is not necessary to evaluate the page fault bit and/or to swap in the page corresponding to the page table entry (153).

In general, the table ID (143) can be divided into multiple fields used to locate the page table (151). For example, the table ID (143) can include a top table ID identifying a top-level page table and a top table entry ID that is used as an index into the top-level page table to retrieve a page table entry containing an identifier of the page table (151), in a way similar to the entry ID (145) indexing into the page table (151) to identify the page table entry (153) containing the base (157).

In general, an entry ID (145) can be considered a virtual page number in the page table (151); and the virtual page number (e.g., 145) can be used in the page table (151) to look up the page table entry (153) containing the base (157).

For example, the table ID (143) can include a set of virtual page numbers that can be used to identify a chain of page tables (e.g., 151). Each virtual page number is used as an index in a page table (or page directory) to identify the page table entry (or page directory entry) that contains the identity or base of the next level page table (or page directory).

In some instances, different running processes in a computer can have different virtual address spaces (e.g., 127); and the process ID of a running process can be used in determine the top-level page table (or page directory). In some instances, a hash of a portion of the virtual address (141), the process ID, and/or an identification of a virtual machine hosted in the computer system can be used to locate the top-level page table (or page directory). In some instances, a hash is used as an index or key to look up a page table entry. Regardless of how the page table entry (153) is located (e.g., via indexing through multiple page tables, via the use of a hash as an index or key), the content of the page table entry (153) can be configured in a way as illustrated in FIG. 7 to provide the security configuration (107) for different domains (101, 103, . . . , 105) to access the page/memory region (137) and/or the routines stored in the memory region (137) that corresponds to the base (157).

In FIG. 7, the security configuration (107) for a page or region (137) is specified in the bottom-level page table (151), where the page table entry (153) in the bottom-level page table (151) provides the base (157) of the physical address (159).

Alternatively, or in combination, higher-level page tables (or page directories) can also have security configurations for their page table entries (or page directory entries). For example, a page table entry (or page directory entry) identifying the page table (151) can have security configurations for all of the pages in the page table (151); and thus, the domain permission data in the page table entry is applicable to the memory region defined by the page table (151). The hierarchy of security configurations in the chain of page table entries leading to the page table (151) and the security configuration (107) in the bottom-level page table entry (153) can be combined via a logic AND operation or a logic OR operation.

For example, a routine running in a domain (e.g., 101, 103, . . . , 105) can be allowed to access a page identified by the base (157) if all of the permission bits in the chain of page table entries leading to the base (157), including the bottom-level table entry (153), have the value that allows access. Alternatively, a routine running in a domain (e.g., 101, 103, ..., 105) can be allowed to access a page identified by the base (157) if any of the permission bits in the chain of page table entries leading to the base (157), including the bottom-level table entry (153), have the value that allows access.

For example, a routine running in a domain (e.g., 101, 103, ..., 105) can be denied of access to a page identified by the base (157) if any of the permission bits in the chain of page table entries leading to the base (157), including the bottom-level table entry (153), have the value that denies access. Alternatively, a routine running in a domain (e.g., 101, 103, ..., 105) can be denied of access to a page identified by the base (157) only when all of the permission bits in the chain of page table entries leading to the base (157), including the bottom-level table entry (153), have the value that denies access.

For example, when a non-bottom-level page table entry (or page directory entry) indicates that the memory access is prohibited, the operations to translate from the virtual address (141) to the physical address (159) can be interrupted to reject the memory access associated with the virtual address (141). In response to the rejection, a trap to the software designated to handle the rejection is used.

For example, the security configuration (107) can include a set of sandbox setting bits (e.g., 111, 113, ..., 115) for the set of domains (101, 103, ..., 105) respectively. When a sandbox setting bit (e.g., 111, 113, ..., or 115) corresponding to the current domain (123) in the domain register (117) is set to have a first value (e.g., 1 or 0), a current call from a routine in the current domain (123) to a called routine (135) stored in the region (137) is implemented to use a sandboxing operation to protect the calling routine and the called routine (135) from each other (e.g., by using a shadow stack to separate the caller and callee in stack usage). When a sandbox setting bit (e.g., 111, 113, ..., or 115) corresponding to the current domain (123) in the domain register (117) is set to have a second value (e.g., 0 or 1), a call from the routine in the current domain (123) to the called routine (135) stored in the memory region (123) is implemented without using the sandboxing operation to isolate the caller and callee from each other (e.g., without using a shadow stack).

Optionally, the security configuration (e.g., 107) is specified in the bottom-level page table (151) but not in the higher-level page tables (directories).

Figure 8:
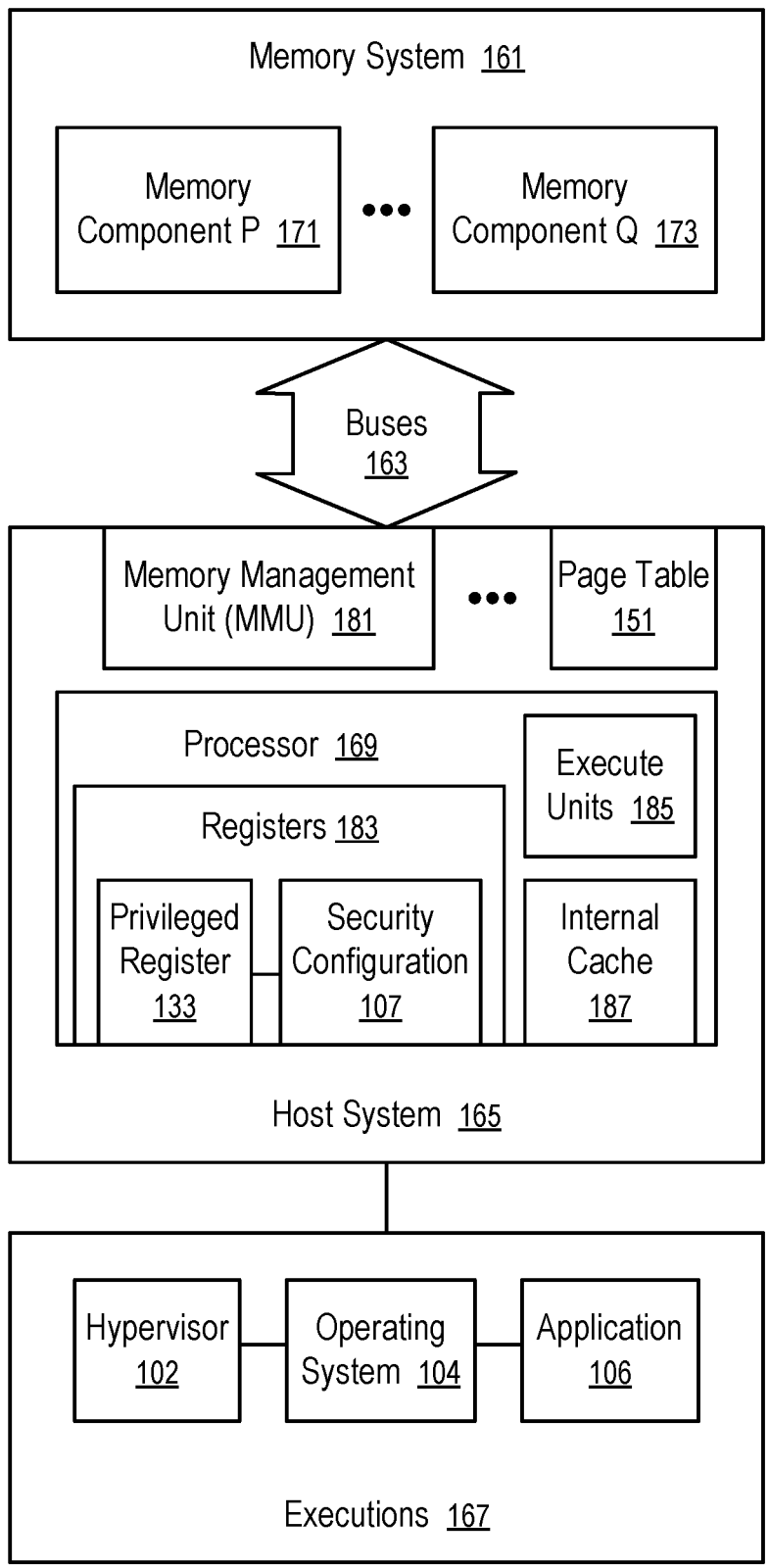
FIG. 8 shows a computer system having a domain register controlling security operations.

FIG. 8 shows a computer system having a domain register (117) controlling security operations.

For example, the computer system of FIG. 8 can optionally have a page table (e.g., 151) storing security configuration (107) for accessing memory region identified by a page table entry (153) of FIG. 7 by routines in predefined domains (101, 103, ..., 105) illustrated in FIGS. 1 and 6. Further the computer system of FIG. 8 can optionally have the domain access tables (217, ..., 227) of FIGS. 1 and 2 to facilitate and secure domain crossing.

For example, the computer system of FIG. 8 can have one or more permission registers storing the security configuration (107) for accessing the privileged register (133) for predefined domains (101, 103, ..., 105) illustrated in FIGS. 1 and 6.

The domain register (117) of the processor (169) stores the identifier of the current domain (123). The content of the domain register (117) selects a set of applicable settings of the security configuration (107) corresponding to the current domain (123).

The computer system of FIG. 8 has a host system (165) coupled to a memory system (161) via one or more buses (163). The memory system (161) has memory components (171, ..., 173).

For example, the buses (163) can include a memory bus connecting to one or more memory modules and/or include a peripheral internet connecting to one or more storage devices. Some of the memory components (171, ..., 173) can provide random access; and the some of the memory components (171, ..., 173) can provide persistent storage capability. Some of the memory components (171, ..., 173) can be volatile in that when the power supply to the memory component is disconnected temporarily, the data stored in the memory component will be corrupted and/or erased. Some of the memory components (171, ..., 173) can be non-volatile in that the memory component is capable of retaining content stored therein for an extended period of time without power.

In general, a memory system (161) can also be referred to as a memory device. An example of a memory device is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory device is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some instances, the memory device is a hybrid memory/storage system that provides both memory functions and storage functions.

The memory components (171, ..., 173) can include any combination of the different types of non-volatile memory components and/or volatile memory components. An example of non-volatile memory components includes a negative-and (NAND) type flash memory with one or more arrays of memory cells such as single level cells (SLCs) or multi-level cells (MLCs) (e.g., triple level cells (TLCs) or quad-level cells (QLCs)). In some instances, a particular memory component can include both an SLC portion and an MLC portion of memory cells. Each of the memory cells can store one or more bits of data (e.g., data blocks) used by the host system (165). Alternatively, or in combination, a memory component (171, ..., or 173) can include a type of volatile memory. In some instances, a memory component (171, ..., or 173) can include, but is not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and/or a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

In general, a host system (165) can utilize a memory system (161) as physical memory (109) that includes one or more memory components (171, ..., 173). The host system (165) can load instructions from the memory system (161) for execution, provide data to be stored at the memory system (161), and request data to be retrieved from the memory system (161).

In FIG. 8, the host system (165) includes a memory management unit (MMU) (181) and a processor (169). The processor (169) has execution units (e.g., 185), such as an arithmetic-logic unit. The processor (169) has registers (183, e.g., 133) to hold instructions for execution, data as operands of instructions, and/or results of instruction executions. The processor (169) can have an internal cache (187) as a proxy of a portion of the memory system (161).

In some instances, the host system (165) can include multiple processors (e.g., 169) integrated on a same silicon die as multiple processing cores of a central processing unit (CPU).

Routines programmed for executing in the processor (169) can be initially stored in the memory system (161). The routines can include instructions for a hypervisor (102), an operating system (104), and an application (106). The routines stored initially in the memory system (161) can be loaded to the internal cache (187) and/or the registers (183, e.g., 133) for execution in the execution units (185).

The running instances of the routines form the executions (167) of the hypervisor (102), the operating system (104), and the application (106). In some instances, a hypervisor (102) is not used; and the operating system (104) controls the hardware components (e.g., the memory system (161), peripheral input/output devices, and/or network interface cards) without a hypervisor.

The executions (167) of the hypervisor (102), the operating system (104), and/or the application (106) access memory (137) (e.g., in memory components (171, ..., 173)) using virtual memory addresses (e.g., 141) defined in one or more virtual memory spaces (e.g., 127). At least one page table (151) (e.g., as illustrated in the FIG. 7) can be used to translate the virtual memory addresses (e.g., 141) used in the execution to the physical memory addresses (e.g., 159) of the memory components (e.g., 171, ..., 173).

As illustrated in FIG. 1, the executions of the routines of hypervisor (102), the operating system (104), and the application (106) can be organized into a plurality of domains (101, 103, ..., 105). For each of the execution domains (101, 103, ..., 105) and a memory region (137) identified by a page table entry (153), the page table entry (153) identifies a set (e.g., 111, 113, ..., 115) of security configuration bits for accessing the region (137) in predefined types of operations such as read, write, execution, etc. The configuration bits of the corresponding security configuration (e.g., 107) controls the memory accesses of the corresponding types from a respective execution domain (e.g., 101) and/or controls the sandboxing operations for isolating calling routines and called routines (e.g., 135).

The security configuration (107) of the privileged register (133) can be stored in separate permission registers. Each of the permission registers is pre-associated with a domain (e.g., 101, 103, ..., 105). A permission register stores a permission bit for accessing the privileged register (133) from the corresponding domain (e.g., 101, 103, ..., or 105). Different permission bits in the permission register can be configured for different privileged registers (e.g., 133). In some instances, a privileged register (133) can have multiple permission bits in a permission register for different types of accesses (e.g., read, write, execution).

Alternatively, permission bits for the privileged register (133) can be specified in a same permission register. Further, permission bits for different privileged register (e.g., 133) can be stored in different portions of the same permission register.

Figure 9:
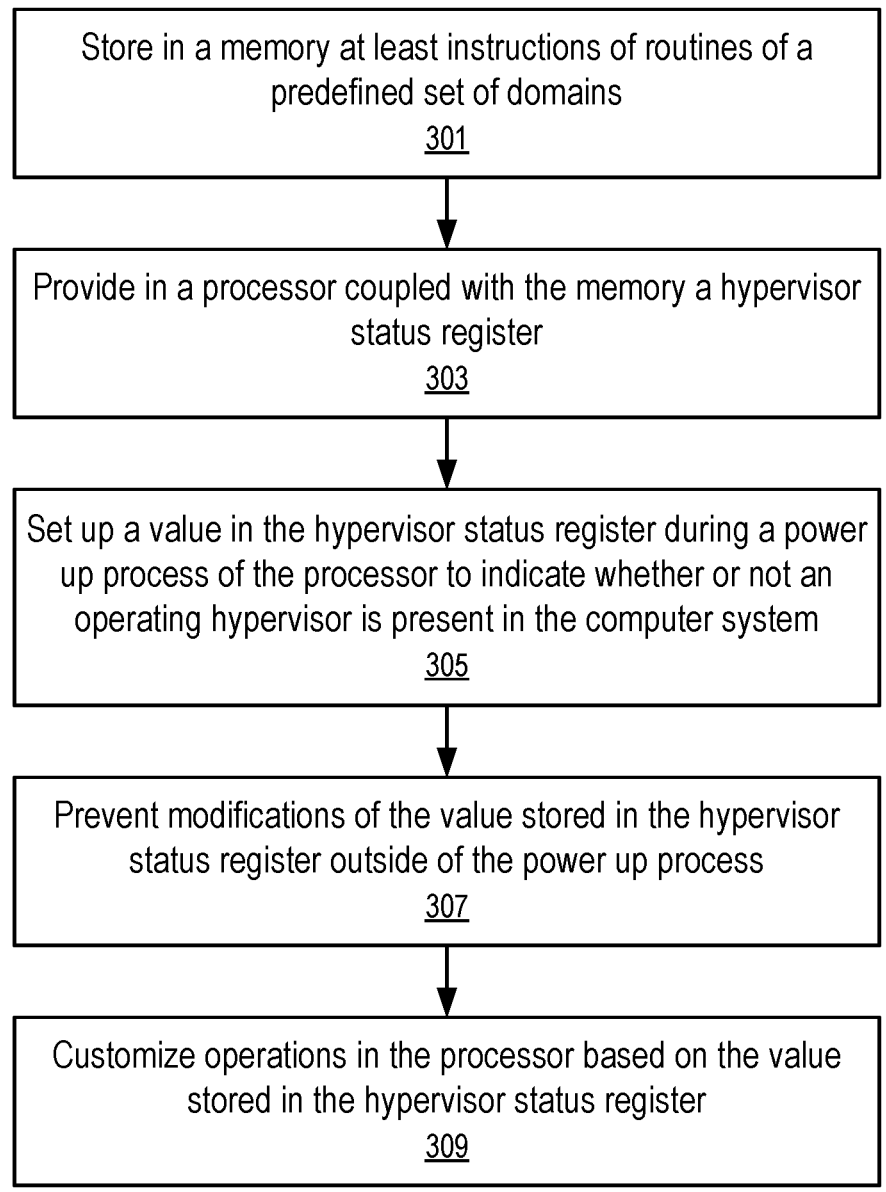
FIG. 9 shows a method to dynamically configure a computer processor according to a hypervisor presence status.

FIG. 9 shows a method to dynamically configure a computer processor (169) according to a hypervisor presence status.

For example, the method of FIG. 9 can be performed in a computer system of FIG. 1 or 8. The method of FIG. 9 can be performed in combination of address translation techniques of FIGS. 2-5 and 7 and/or the security techniques of FIGS. 6-8.

At block 301, a memory (109) of a computer system stores at least instructions of routines of a predefined set of domains (101, 103, ..., 105).

For example, the predefined set of domains can include at least one of a domain for hypervisor, a domain for operating system, or a domain for application, or any combination thereof.

At block 303, the computer system provides, in a processor (169) coupled with the memory (109), a hypervisor status register (233).

At block 305, the computer system sets up a value in the hypervisor status register (233) during a power up process of the processor (169) to indicate whether or not an operating hypervisor (102) is present in the computer system.

At block 307, the processor (169) prevents modifications of the value stored in the hypervisor status register outside of the power up process.

At block 309, the processor (169) customize its operations based on the value stored in the hypervisor status register (233).

For example, the processor (169) can customize address translation (235) of its memory management unit (181) to the value stored in the hypervisor status register (233). When the hypervisor status register (233) indicates that an operating hypervisor (102) is present in the computer system, the processor can use a virtual machine identifier in address translation (235). When the hypervisor status register (233) indicates that no operating hypervisor is present in the computer system, the processor can perform address translation (235) without using a virtual machine identifier.

For example, when the hypervisor status register (233) indicates that an operating hypervisor (102) is present in the computer system, the processor (169) is configured to trap an operation performed in execution of an operating system (104) running in a virtual machine in generating a page table entry mapping a virtual address page to a pseudo-physical address page. In response to the operation of the operating system (104) running in the virtual machine is trapped, the processor (169) is configured to execute a routine of the hypervisor to identify a physical address page corresponding to the pseudo-physical address page in the virtual machine. The processor (169) is configured to modify the page table entry mapping the virtual address page to the pseudo-physical address page into a page table entry mapping the virtual address page to the physical address page, such that subsequent translation from the pseudo-physical addresses in the virtual machine to the physical addresses in the memory (109) can be avoided for the virtual address page.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to performing processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. An apparatus, comprising:
   a memory configured to store at least instructions of routines of a predefined set of domains; and
   a processor coupled with the memory, the processor comprising a status register, and the processor configured to:
   determine a value stored in the status register, the value indicative of whether or not an operating hypervisor is present; and
   customize an operation of a computer system based on the value stored in the status register;
   wherein the value stored in the status register is not adjustable outside of a power up process of the apparatus.

2. The apparatus of claim 1, wherein the power up process comprises an initial powering on of the processor of the apparatus.

3. The apparatus of claim 1, wherein the processor is further configured to store the value in the status register during a power up process of the apparatus.

4. The apparatus of claim 1, wherein the predefined set of domains comprises at least one of a domain for hypervisor, a domain for operating system, or a domain for application, or any combination thereof.

5. The apparatus of claim 4, wherein the predefined set of domains have no predefined levels of trust.

6. The apparatus of claim 1, wherein the customization of the operation comprises the processor configured to customize address translation operations in the processor according to the value stored in the status register.

7. The apparatus of claim 6, wherein the customization of the operation comprises the processor configured to use a virtual machine identifier in address translation in response to the status register indicating that an operating hypervisor is present in the apparatus.

8. The apparatus of claim 6, wherein the customization of the operation comprises the processor configured to perform address translation without using a virtual machine identifier in response to the status register indicating that no operating hypervisor is present in the apparatus.

9. The apparatus of claim 6, wherein the customization of the operation comprises the processor configured to trap an operation performed in execution of an operating system running in a virtual machine in generating a page table entry mapping a virtual address page to a pseudo-physical address page, in response to the status register indicating that an operating hypervisor is present in the apparatus.

10. The apparatus of claim 9, wherein the processor is configured to execute a routine of the hypervisor to identify a physical address page corresponding to the pseudo-physical address page in the virtual machine, in response to the operation of the operating system running in the virtual machine is trapped.

11. The apparatus of claim 10, wherein the processor is configured to modify the page table entry mapping the virtual address page to the pseudo-physical address page into a page table entry mapping the virtual address page to the physical address page.

12. A processor, comprising:
    a status register, and the processor configured to:
    determine a value stored in the status register, the value indicative of whether or not an operating hypervisor is present in the system; and
    customize an operation of a computer system comprising the processor on the value stored in the status register;
    wherein the value stored in the status register is not adjustable outside of a power up process of the apparatus.

13. The processor of claim 12, wherein the customization of the operation comprises the processor configured to customize translation of virtual memory addresses to physical memory addresses according to the value stored in the status register.

14. The processor of claim 12, wherein the customization of the operation comprises the processor configured to apply a security control to a resource of the computer system based on the value stored in the status register.

15. The processor of claim 14, wherein the resource comprises at least one of a privileged register, a called routine, or a memory region of a memory device of the computer system.

16. The processor of claim 14, wherein processor is coupled to a memory, and the memory is configured to store at least instructions of routines of a predefined set of domains, and further wherein the processor is further configured to, during execution of one of the routines, select a setting for the security control that is preassociated with a domain for which one of the routines is being executed.

17. The processor of claim 16, wherein the setting is indicative of whether access to the memory is permissible while the one of the routines is being executed.

18. A method, comprising:
    storing in a memory at least instructions of routines of a predefined set of domains;
    providing, in a processor coupled with the memory, a status register;
    setting up a value in the status register to indicate whether or not an operating hypervisor is present; and customizing operations in the processor based on the value stored in the status register;

wherein the value stored in the status register is not adjustable outside of a power up process of the apparatus.

19. The method of claim 18, wherein the customizing of the operations comprising:

customizing translation of virtual memory addresses to physical memory addresses according to the value stored in the status register.

20. The method of claim 18, wherein the customizing of the operations comprising:

applying a security control to a resource of the computer system based on the value stored in the status register.

* * * * *